(12) United States Patent
Kim et al.

(10) Patent No.: US 9,769,005 B2
(45) Date of Patent: Sep. 19, 2017

(54) METHOD AND DEVICE FOR TRANSMITTING AND RECEIVING SIGNAL ON BASIS OF MULTIPLE ANTENNAS

(71) Applicant: Samsung Electronics Co., Ltd., Gyeonggi-do (KR)

(72) Inventors: Jaewon Kim, Seoul (KR); Jeongho Park, Seoul (KR); Min Sagong, Gyeonggi-do (KR); Chiwoo Lim, Gyeonggi-do (KR); Suryong Jeong, Gyeonggi-do (KR); Sungnam Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/915,183

(22) PCT Filed: Aug. 26, 2014

(86) PCT No.: PCT/KR2014/007941
§ 371 (c)(1),
(2) Date: Feb. 26, 2016

(87) PCT Pub. No.: WO2015/030468
PCT Pub. Date: Mar. 5, 2015

(65) Prior Publication Data
US 2016/0212006 A1 Jul. 21, 2016

(30) Foreign Application Priority Data
Aug. 26, 2013 (KR) .................. 10-2013-0101146

(51) Int. Cl.
*H04L 27/36* (2006.01)
*H04L 27/32* (2006.01)
(Continued)

(52) U.S. Cl.
CPC ............. *H04L 27/366* (2013.01); *H04B 7/06* (2013.01); *H04J 11/0059* (2013.01);
(Continued)

(58) Field of Classification Search
CPC ......... H04L 27/32; H04L 27/10; H04L 27/34; H04L 27/38; H04L 27/12; H04L 27/364;
(Continued)

(56) References Cited

U.S. PATENT DOCUMENTS 5,214,641 A * 5/1993 Chen .................... H04L 5/06
370/484
2009/0021321 A1* 1/2009 Manku .................. H03C 5/00
332/151

(Continued)

OTHER PUBLICATIONS

International Search Report dated Dec. 8, 2014 in connection with International Patent Application No. PCT/KR2014/007941, 5 pages.

(Continued)

*Primary Examiner* — Syed Haider

(57) ABSTRACT

A method and a device for transmitting and receiving a signal on the basis of multiple antennas are provided.
A transmitting device may include a radio frequency (RF) module transmitting a quadrature amplitude modulation (QAM) signal of a first symbol corresponding to a hybrid frequency shift keying and quadrature amplitude modulation (FQAM) mode and transmitting a QAM signal of a second symbol corresponding to a QAM mode through a second antenna; and a modulation module mapping the QAM signal of the first symbol to one frequency tone among the preset number of frequency tones according to a frequency shift keying (FSK) signal of the first symbol and mapping the second symbol to the frequency tone to which the first symbol is mapped.

20 Claims, 33 Drawing Sheets

(51) Int. Cl.
*H04B 7/06* (2006.01)
*H04L 27/10* (2006.01)
*H04L 27/34* (2006.01)
*H04J 11/00* (2006.01)
*H04L 27/12* (2006.01)
*H04L 27/38* (2006.01)
*H04L 27/26* (2006.01)

(52) U.S. Cl.
CPC .............. *H04L 27/10* (2013.01); *H04L 27/12* (2013.01); *H04L 27/32* (2013.01); *H04L 27/34* (2013.01); *H04L 27/364* (2013.01); *H04L 27/367* (2013.01); *H04L 27/38* (2013.01); *H04L 27/2601* (2013.01)

(58) Field of Classification Search
CPC .... H04L 27/366; H04L 27/367; H04J 11/059; H04B 7/06; H04B 10/60
See application file for complete search history.

(56) References Cited

U.S. PATENT DOCUMENTS

| | | | |
|---|---|---|---|
| 2010/0208834 A1* | 8/2010 | van Zelst | H04B 7/0447 375/267 |
| 2010/0220651 A1* | 9/2010 | Chen | H04L 5/0007 370/328 |
| 2011/0164557 A1 | 7/2011 | Ariyavisitakul et al. | |
| 2012/0039410 A1* | 2/2012 | Feher | H04L 27/34 375/261 |
| 2012/0045986 A1 | 2/2012 | Jitsukawa | |
| 2012/0147814 A1* | 6/2012 | Valbonesi | H04W 72/1215 370/328 |
| 2013/0343491 A1* | 12/2013 | Eliaz | H04L 27/2628 375/340 |

OTHER PUBLICATIONS

Written Opinion of the International Searching Authority dated Dec. 8, 2014 in connection with International Patent Application No. PCT/KR2014/007941, 4 pages.

Asma Latif, et al., "On the PAPR Reduction Properties of Hybrid QAM-FSK(HQFM) OFDM Transceiver", Journal of Applied Sciences, vol. 8, issue 6, pp. 1061-1066, 2008.

* cited by examiner

METHOD AND DEVICE FOR TRANSMITTING AND RECEIVING SIGNAL ON BASIS OF MULTIPLE ANTENNAS

TECHNICAL FIELD

The present invention relates to a method and a device for transmitting and receiving a signal using multiple antennas.

BACKGROUND ART

A wireless communication system has been developed for supporting higher data transmission rate in order to satisfy a continuously increasing demand for wireless data traffic. For example, technologies for the wireless communication system capable of improving spectral efficiency and increasing channel capacity on the basis of a communication technology such as an orthogonal frequency division multiplexing (hereinafter, referred to as OFDM) scheme and multiple input multiple output (MIMO) transmission and reception have been developed in order to increase data transmission rate.

In the wireless communication system, users having a low signal-to-noise ratio (SNR) or users at a cell edge remote from a cell center that have a low carrier-to-interference and noise ratio (CINR) due to interference from a base station of an adjacent cell may be offered with limited quality of services. In order to improve transmission efficiency for the cell-edge users, technologies such as inter-cell interference-coordination (ICIC), coordinated multi-points (CoMP), interference cancellation, etc. have been introduced.

A more improved technology capable of improving spectral efficiency and increasing channel capacity of the system while considering a quality of service for the users having a low SNR or the cell-edge users using multiple antennas is required.

DISCLOSURE OF INVENTION

Technical Problem

An aspect of the present invention proposes a method and a device for transmitting and receiving a signal of a modulation mode allowing interference to have a non-Gaussian characteristic using multiple antennas, in transmitting and receiving the signal using the multiple antennas.

Another aspect of the present invention proposes a method and a device for transmitting and receiving a signal on the basis of multiple antennas, which transmit and receive symbols through a frequency tone selectively designated among a plurality of frequency tones based on the multiple antennas, in transmitting and receiving the signal using the multiple antennas.

Still another aspect of the present invention proposes a method and a device for transmitting and receiving a signal on the basis of multiple antennas, which allow interference in a system to have a characteristic similar to a non-Gaussian characteristic while transmitting a symbol corresponding to a modulation mode in which frequency shift keying (FSK) and quadrature amplitude modulation are combined through the multiple antennas, in transmitting and receiving the signal using the multiple antennas.

Still another aspect of the present invention proposes a method and a device for transmitting and receiving a signal on the basis of multiple antennas, which modulate and demodulate symbols using at least one of an FSK mode and a QAM mode in a system having a non-Gaussian characteristic, in transmitting and receiving the signal using the multiple antennas.

Solution to Problem

In accordance with an aspect of the present invention, a method for transmitting a signal on the basis of multiple antennas, the method includes: mapping a quadrature amplitude modulation (QAM) signal of a first symbol corresponding to a hybrid frequency shift keying and quadrature amplitude modulation (FQAM) mode to one frequency tone among the preset number of frequency tones according to a frequency shift keying (FSK) signal of the first symbol; mapping a QAM signal of a second symbol corresponding to a QAM mode to the frequency tone to which the QAM signal of the first symbol is mapped; and transmitting the QAM signal of the first symbol through a first antenna and transmitting the QAM signal of the second symbol through a second antenna.

In accordance with another aspect of the present invention, a transmitting device for transmitting a signal on the basis of multiple antennas, the transmitting device includes: a radio frequency (RF) module configured to transmit a QAM signal of a first symbol corresponding to an FQAM mode through a first antenna and transmit a QAM signal of a second symbol corresponding to a QAM mode through a second antenna; and a modulation module configured to map the QAM signal of the first symbol to one frequency tone among the preset number of frequency tones according to an FSK signal of the first symbol and map the QAM signal of the second symbol to the frequency tone to which the QAM signal of the first symbol is mapped.

In accordance with still another aspect of the present invention, a method for receiving a signal, the method includes: spatially dividing at least one channel among a plurality of channel from a received signal; detecting tone location information on one activated frequency tone among the preset number of frequency tones of the received signal; and demodulating at least one QAM signal received through at least one channel in the activated frequency tone.

In accordance with yet still another aspect of the present invention, a receiving device for receiving a signal, the receiving device includes: a multi-antenna reception signal processing module configured to spatially divide at least one channel among a plurality of channels from a received signal; an activation tone detection module configured to detect tone location information on one activated frequency tone among the preset number of frequency tones of the received signal; and a demodulation module configured to demodulate at least one QAM signal received through at least one channel in the activated frequency tone.

Advantageous Effects of Invention

According to the aspects of the present invention, symbols corresponding to the multiple antennas are mapped to a frequency tone designated among the preset frequency tones and not mapped to the rest frequency tones, thereby obtaining an effect that the system may have an interference characteristic similar to the non-Gaussian form and channel capacity may be increased.

Further, in consideration of a frequency tone to which a symbol corresponding to the modulation mode in which the FSK and the QAM are combined, a frequency tone to which other symbol transmitted together through the multiple antennas is mapped is designated, thereby obtaining an effect of providing a plan for more effectively utilizing resources.

Further, tone location information of an activated tone carrying a QAM signal of a symbol corresponding to the modulation mode in which the FSK and the QAM are combined is detected, and at least one of demodulation of a plurality of symbols or acquisition of a bit stream based on the tone location information is performed, thereby obtaining an effect of providing a plan for efficiently demodulating symbols transmitted through the multiple antennas.

MODE FOR THE INVENTION

Figure 1:
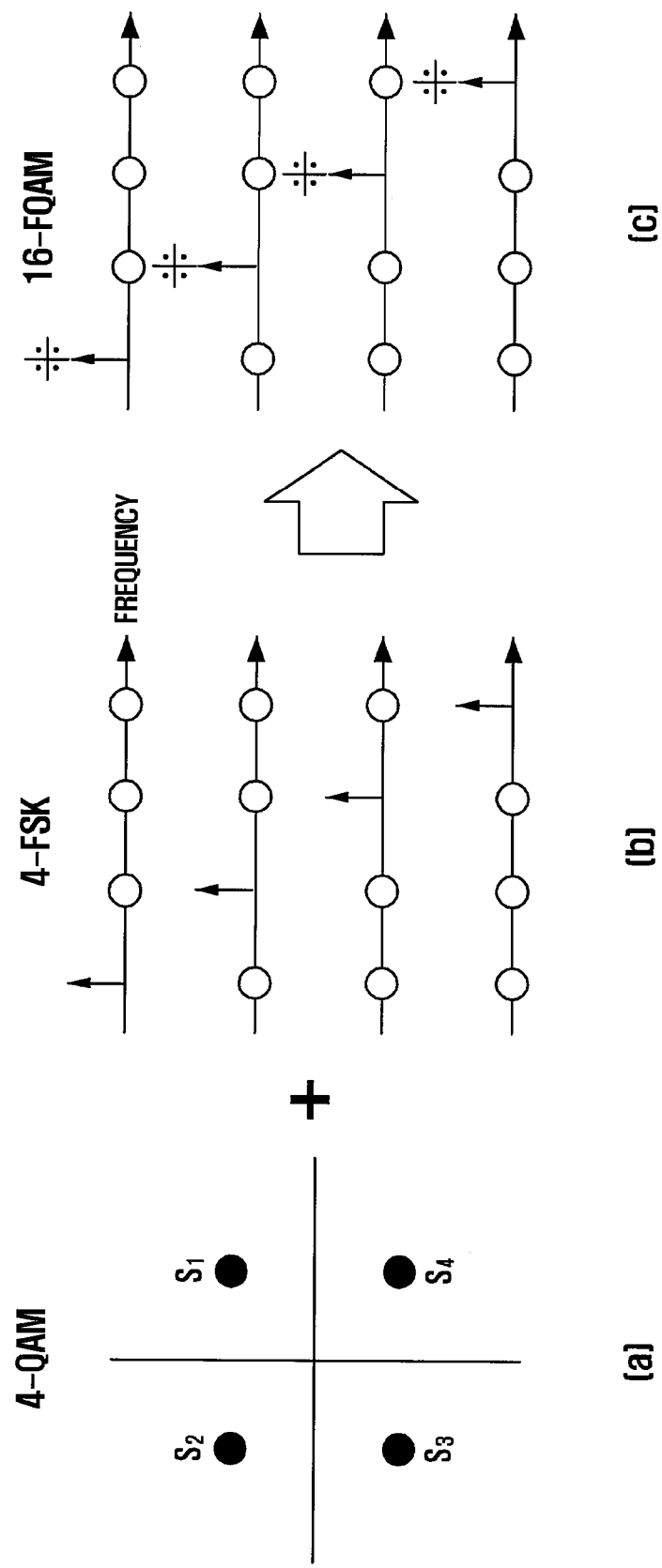
FIG. 1 is a conceptual diagram for describing a hybrid Frequency Shift Keying and Quadrature Amplitude Modulation (FQAM) mode used as a modulation mode of a symbol according to an embodiment of the present invention.

Hereinafter, a method for manufacturing and using a device for transmitting and receiving a signal on the basis of multiple antennas according to the present invention will be described in detail. Terms "unit", "module", or the like, described in the specification means a unit of processing at least one function or operation and may be implemented by hardware or software or a combination of hardware and software.

An electronic device according to an embodiment of the present invention may include at least one of a transmitting device and a receiving device. The electronic device may be implemented in various forms. For example, the electronic device described in the present specification may include a device having a communication function such as a base station, an access point, a portable terminal, a computer, a communication card, a modem chip, a dongle, or the like, or a device capable of providing the communication function by being combined with other device, but is not limited thereto. Further, the portable terminal may include a cellular phone, a smart phone, a laptop computer, a tablet PC, an e-book terminal, a digital broadcasting terminal, a personal digital assistant (PDA), a portable multimedia player (PMP), a navigation, a wearable PC, a wrist-watch phone, and the like.

A system according to an embodiment of the present invention may include at least two electronic devices. The system may have channel characteristics or interference characteristics as a communication environment in which transmission and reception between the electronic devices are performed. Further, a configuration profile, an operating rule, a protocol according to a communication standard, or the like that is designated by a manufacturer, a service provider, or the like may be determined in advance and stored in the electronic devices included in the system.

Hereinafter, embodiments of the present invention will be described in detail with reference to the accompanying drawings so that those skilled in the art to which the present invention pertains may easily practice the present invention. However, the present invention may be implemented in various different ways and is not limited to the embodiments described herein. Further, in the accompanying drawings, portions unrelated to the description will be omitted in order to obviously describe the present invention, and similar reference numerals will be used to describe similar or same portions throughout the present specification.

In the system according to an embodiment of the present invention, interference may have a Gaussian interference characteristic, but may have a non-Gaussian characteristic as well.

For example, a plurality of frequency tones may be used as resources in the system. A multiplexing scheme of the system in which the plurality of frequency tones are used as the resources may include, for example, an orthogonal frequency division multiplexing (OFDM) scheme, a single carrier-OFDM (SC-OFDM) scheme, a frequency division multiplexing (FDM) scheme, or the like. When all the plurality of frequency tones are used as resources for signal transmission, an interference signal in the system may have a high level of Gaussian characteristic. Meanwhile, in a case in which the designated number of activation tones among the plurality of frequency tones are used, and the rest tones are nulled or not used, the interference signal in the system may have a high level of non-Gaussian characteristic. For example, a hybrid frequency shift keying and quadrature amplitude modulation (FQAM) mode may be used in transmission and reception in the system so that the system has the non-Gaussian interference characteristic.

Hereinafter, the system having the non-Gaussian interference characteristic will be described in more detail with reference to FIGS. 1 to 3.

FIG. 1 is a conceptual diagram for describing a hybrid Frequency Shift Keying and Quadrature Amplitude Modulation (FQAM) mode used as a modulation mode of a symbol according to an embodiment of the present invention.

The FQAM mode may be a mode in which a frequency shift keying (FSK) mode and a quadrature amplitude modulation (QAM) mode are combined.

For example, (c) of FIG. 1 illustrates 16-FQAM having a level number of 16 divided in a constellation as a modulated symbol. As an example, the 16-FQAM may be that in which 4-QAM illustrated in (a) of FIG. 1 and 4-FSK illustrated in (b) of FIG. 1 are combined. Here, the 16-FQAM may also be written as 4F4QAM in order to indicate level degrees of the QAM and the FSK together.

Figure 2:
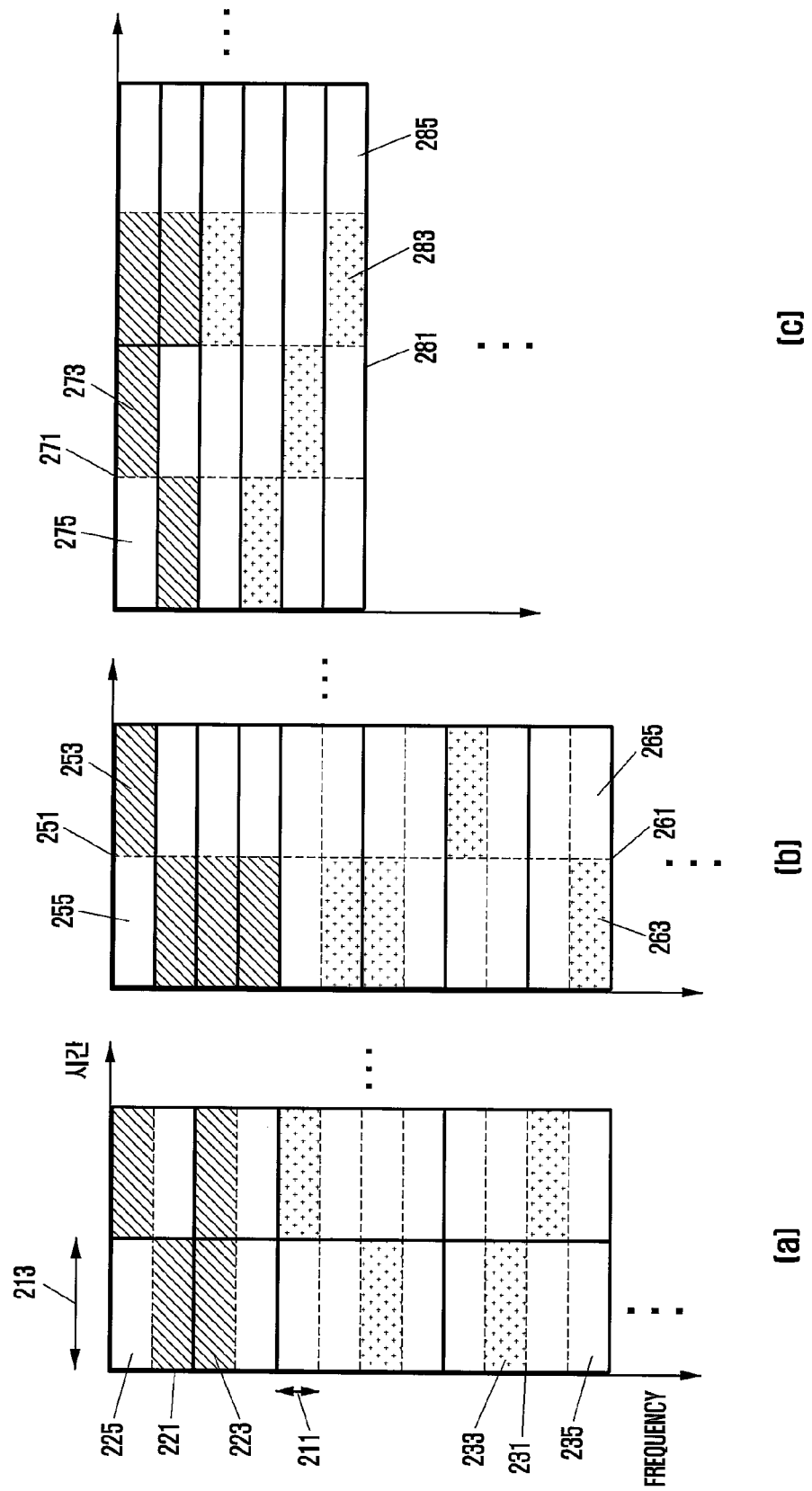
FIG. 2 is an exemplified diagram illustrating resources in a time domain and a frequency domain for transmitting and receiving a signal according to an embodiment of the present invention.

FIG. 2 is an exemplified diagram illustrating resources in a time domain and a frequency domain for transmitting and receiving a signal according to an embodiment of the present invention.

For example, to have the Gaussian interference characteristic, in the system, a QAM signal of a symbol corresponding to the FQAM mode may be used by being mapped to the designated number of activation tones among the preset number of frequency tones, and the symbol may not be mapped to the at least one remaining tone. Referring to (a) of FIG. 2, a basic resource element may be a resource consisting of one frequency tone 211 during one slot 213 time duration. As an example, the slot 213 may be an OFDM symbol time.

In the system, an FQAM resource element for transmitting and receiving the symbol corresponding to the FQAM mode is a resource in a two-dimensional area divided into a time duration including at least one slot and a frequency band including at least one frequency tone, and may have the preset number of basic resource elements.

The symbol corresponding to the FQAM mode (hereinafter, referred to as FQAM symbol) may be a unit signal transmitted or received through a frequency resource having a preset size (e.g. a frequency band size of the FQAM resource element) during a time having a preset length (e.g. a length of the time duration of the FQAM resource element), or may be data corresponding to the unit signal. For example, the FQAM symbol that is data corresponding to the unit signal may be represented or defined in various forms such as a bit stream belonging to a codeword, a modulated signal, or a signal that is transmitted or received depending on an operation or a step for processing a communication signal. As an example, the FQAM symbol may be represented as a channel-encoded bit stream "110". Further, as an example, when the bit stream "110" is modulated by 2F4QAM, the FQAM symbol includes a 2-FSK signal indicating a value "1" (or tone location information corresponding to an FSK signal indicating a value "1") and a 4-QAM signal indicating a value "10" in the bit stream, and may be represented as a modulated signal. Further, when the FQAM symbol (or modulated signal) is transmitted using the FQAM resource element, the FQAM symbol may also be represented as a signal that is transmitted or received.

The preset number of basic resources elements belonging to the FQAM resource element may correspond to the level number of FSK signal of the FQAM symbol. Further, an activated time duration slot or a location of a frequency tone in the FQAM resource element may be determined according to the FSK signal of the FQAM symbol. Accordingly, the time duration slot or tone location information of the frequency tone in the FQAM resource element may be used as information for demodulation together with QAM constellation information in the activated frequency tone.

In (a) of FIG. 2, the FQAM resource elements 221 and 231 may consist of the preset number of frequency tones during one slot time duration. Here, the preset number may correspond to the level number of FSK signal of the FQAM symbol. (a) of FIG. 2 illustrates the FQAM resource element 221 having two frequency tones during one slot time duration and the FQAM resource element 231 having four frequency tones during one slot time duration. For example, the FQAM resource element 221 may be used to transmit and receive the modulated symbol by the 2F4QAM in which the 2-FSK and the 4-QAM are combined. In the FQAM resource element 221, a frequency tone 223 represents an activation tone carrying the QAM signal by being designated according to the FSK signal of the FQAM symbol, and a frequency tone 225 represents a nulled tone (hereinafter, referred to as null tone) that is not used. The FQAM resource element 231 may be used to transmit and receive the modulated symbol by the 4F4QAM in which the 4-FSK and the 4-QAM are combined. In the FQAM resource element 231, a frequency tone 233 represents an activation tone, and a frequency tone 235 represents a null tone.

Further, in (a), (b), or (c) of FIG. 2, the location of the activation tone in the FQAM resource, element may also be designated according to a preset function regardless of the FSK signal of the FQAM symbol or the tone location information. Further, the location of the activation tone in the FQAM resource element may also be designated according to a preset mapping rule or a preset function having the FSK signal or the tone location information as a variable. Accordingly, the modulation mode of the symbol mapped to the resource illustrated in (a), (b), or (c) of FIG. 2 may also be a modulation mode in which a specific modulation mode that is different from the FSK and the QAM mode are combined, but for convenience of explanation, it is illustrated that the modulation mode of the symbol illustrated in FIG. 2 is the FQAM.

Further, in (b) of FIG. 2, FQAM resource elements 251 and 261 may consist of the preset number of basic resource elements during two slot time durations. For example, the FQAM resource element 251 may be used to transmit and receive the modulated symbol by the 2F4QAM in which the 2-FSK and the 4-QAM are combined, and may be a two-dimensional area configured of a time duration including two slots and a frequency band including one frequency tone. Further, the FQAM resource element 251 may include two basic resource elements. One of the two basic resource elements may be designated as an activation tone according to the FSK signal of the FQAM symbol to be mapped to the FQAM resource element 251. A frequency tone 253 may represent an activation tone, and a frequency tone 255 may represent a null tone. The FQAM resource element 261 may be used to transmit and receive the modulated symbol by the 4F4QAM in which the 4-FSK and the 4-QAM are combined, and may be a two-dimensional area configured of a time duration including two slots and a frequency band including two frequency tones. Further, the FQAM resource element 261 may include four basic resource elements. One of the four basic resource elements may be designated as an activation tone according to the FSK signal of the FQAM symbol to be mapped to the FQAM resource element 261. A frequency tone 263 may represent an activation tone, and a frequency tone 265 may represent a null tone. In order for interference to adjacent base station to have the non-Gaussian characteristic in the system, three frequency tones except the activation tone 263 in the FQAM resource element 261 as null tones may not be used in transmission and reception of a signal.

Further, (c) of FIG. 2 illustrates that an FQAM resource element 217 and an FQAM resource element 281 are used to transmit the FQAM symbol. The FQAM resource element 271 may be a two-dimensional area configured of a time duration including two slots and a frequency band including one frequency tone like the FQAM resource element 251. The FQAM resource element 271 may include two basic resource elements. A frequency tone 273 may represent an activation tone, and a frequency tone 275 may represent a null tone. The FQAM resource element 281 may have four basic resource elements in an area configured of a time duration including four slots and a frequency band including one frequency tone. A frequency tone 283 may represent an activation tone, and a frequency tone 285 may represent a null tone. As an example, tone location information of the activation tone 283 among the four basic resource elements may correspond to the FSK signal of the FQAM symbol mapped to the FQAM resource element 281.

A level of the QAM illustrated in FIG. 2 may be determined regardless of the number of basic resource elements configuring the FQAM resource element. Further, as illustrated in FIG. 2, FQAM symbols having different levels from each other may be mapped to different FQAM resource elements and operated, and FQAM symbols having the same level may also be operated. Further, the QAM symbol or the symbols of different modulation modes may also be mapped to a frequency band different from the FQAM resource element to which the FQAM symbol is mapped and operated together with the FQAM symbol.

In addition, a signal of a symbol corresponding to various modulation modes including the QAM may also be mapped as well as the QAM signal of the FQAM symbol corresponding to the FQAM mode in a preset resource block like the foregoing FQAM resource element. As an example, when a QAM signal (or modulated signal) of the symbol (hereinafter, referred to as QAM symbol) corresponding to the QAM mode are used by being mapped to a frequency tone (or basic resource element) designated by the preset number or a specific rule in the preset resource block like the FQAM resource element, and the rest frequency tone (or basic resource element) of the resource block is designated as a null tone (or the rest frequency tone is not used), the non-Gaussian characteristic of the interference signal in the system may be increased. Further, referring to (a) of FIG. 2, when the QAM signal of the QAM symbol is transmitted through the resource block like the FQAM resource element 231, tone location information of the activation tone 233 may be used as a separate data from the bit stream representing the QAM symbol. Further, the location of the activation tone 233 may be randomly designated depending on a preset sequence, and the tone location information of the activation tone 233 may not be considered in the receiving device.

Further, an example for the mapping of the symbol and the resource corresponding to the FQAM mode or the QAM mode is described, but the present invention is not limited to the foregoing description, and it should be noted that a modulated signal of a symbol corresponding to various modulation modes and a resource block in various forms may be mapped through various mapping schemes. Further, in a system having the non-Gaussian or the Gaussian interference characteristic through various schemes, signal transmission and reception on the basis of multiple antennas according to an embodiment of the present invention may be performed.

In the system according to the embodiment of the present invention, an FQAM resource element may be used for the signal transmission and reception on the basis of the multiple antennas. Hereinafter, for convenience of explanation, it is assumed that the FQAM resource element is, for example, a resource block used to transmit and receive one symbol as illustrated in (a) of FIG. 2 and configured of the preset number of frequency tones (or basic resource elements) during one slot time duration.

In the system according to the embodiment of the present invention, a symbol corresponding to other modulation mode such as the QAM mode may be used as well as the symbol corresponding to the FQAM mode. Further, even when the symbol of other modulation mode is used, the FQAM resource element may be used as a term indicating the resource block for transmitting the symbol.

Figure 3:
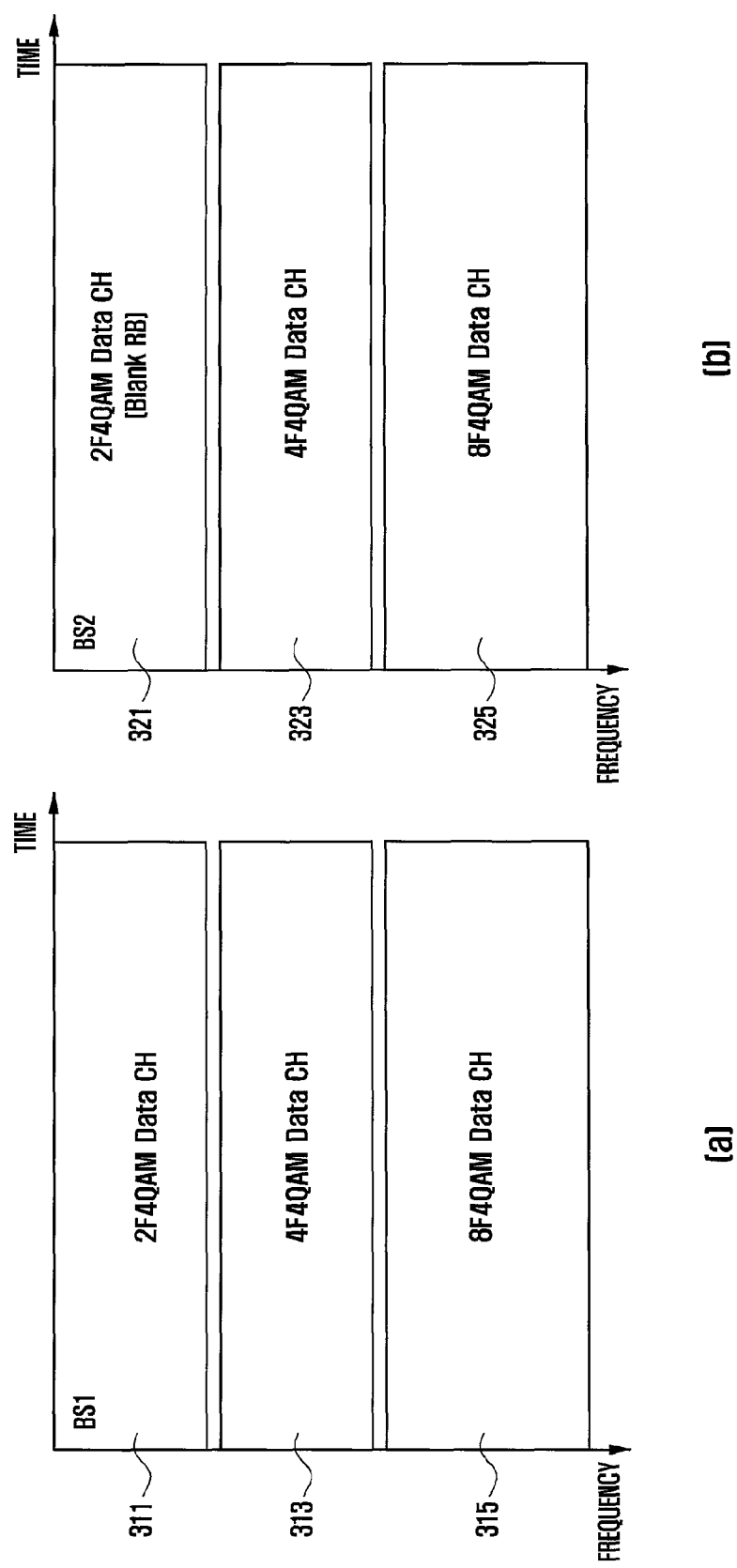
FIG. 3 is an exemplified diagram for describing resources used in a system according to an embodiment of the present invention.

FIG. 3 is an exemplified diagram for describing resources used in a system according to an embodiment of the present invention.

Referring to FIG. 3, a resource (a) may represent a part of a resource of a first base station, and a resource (b) may represent a part of a resource of a second base station adjacent to the first base station. The resource (a) and the resource (b) may be an example representing mapping relationship of the resource allocated in each of the first base station and the second base station so that interference from base stations adjacent to each other has the non-Gaussian characteristic in the system and an FQAM modulation symbol transmitted and received through the allocated resource. For example, resource areas 311, 313, and 315 of the first base station and resource areas 321, 323, and 325 of the second base station may be used as a data channel.

The adjacent base stations may have at least one FQAM resource element having the same form. The adjacent base station may have the FQAM resource element having the same form in a preset resource area divided into a preset time duration and a preset frequency band, or a symbol modulated by the same modulation mode may be mapped to be used. Here, having the FQAM resource element having the same form may mean that the adjacent base stations use the same FQAM resource element in the preset time duration and the preset frequency band, and at least one remaining tone except the activation tone may be processed as a null tone in the same FQAM resource element, respectively. As an example, when the symbol is transmitted using one frequency tone among the preset number of frequency tones belonging to the FQAM resource element in the preset frequency band in the first base station, any one frequency tone among the preset number of frequency tones belonging to the FQAM resource element may be used, and at least one remaining frequency tone may not be used in at least one adjacent base station located at periphery and including the second base station, respectively.

The resource area 311 of the first base station may be, for example, an area in which at least one 2F4QAM (8-FQAM) symbol is transmitted and received through at least one FQAM resource element 321 of FIG. 2. The resource area 321 of the second base station is an area corresponding to the resource area 311, and may be an area in which in which the 2F4QAM symbol is transmitted and received like the first base station in the same time duration and frequency band as those of the resource area 311. Further, in the resource area 321 of the second base station, a part or all of the resource elements may not be used to transmit the symbol, but be nulled.

Further, the resource area 313 of the first base station and the resource area 323 of the second base station have a resource configured of the same time duration and frequency band, and a symbol modulated by the 4F4QAM (or 16-FQAM) may be transmitted and received in the corresponding area.

Further, the resource area 315 of the first base station and the resource area 325 of the second base station have a resource configured of the same time duration and frequency band, and a symbol modulated by the 8F4QAM (or 32-FQAM) may be transmitted and received in the corresponding area.

Further, in the system according to the embodiment of the present invention, a channel code may be designed by considering a symbol modulated by the modulation mode such as the FQAM or the QAM together with a specific modulation mode such as the FQAM or the QAM, in order to utilize the non-Gaussian interference characteristic and improve the performance. Further, the channel code in a specific mode may be applied to a symbol (or bit stream) before modulation. For example, a binary channel code or a non-binary channel code may be selectively applied to a bit stream modulated by the FQAM mode or the QAM mode.

The binary channel code may be a code for performing channel coding so that the binary bit stream is acquired as a result of channel coding, transmission and reception performance of the binary bit stream is improved in the channel, or error correction is possible. The binary bit stream may be represented by binary numbers like, for example, "011101000". The non-binary channel code may be a code for performing channel coding so that the non-binary bit stream is acquired as a result of channel coding, transmission and reception performance of the non-binary bit stream is improved in the channel, or error correction is possible. The non-binary bit stream may be represented by, for example, octal numbers like "350". When the non-binary bit stream "350" of the octal number is symbolized, in the bit stream "011101000", "011" may represent "3", "101" may represent "5", and "000" may represent "0". FQAM modulation or demodulation for the non-binary bit stream will be described in detail with reference to FIGS. 9 and 15.

Hereinafter, referring to FIGS. 4 to 19, an electronic device including a transmitting device or a receiving device will be described. Same reference numeral is used to indicate modules or components performing similar or the same function, and for convenience of explanation, overlapped description may be omitted.

Figure 4:
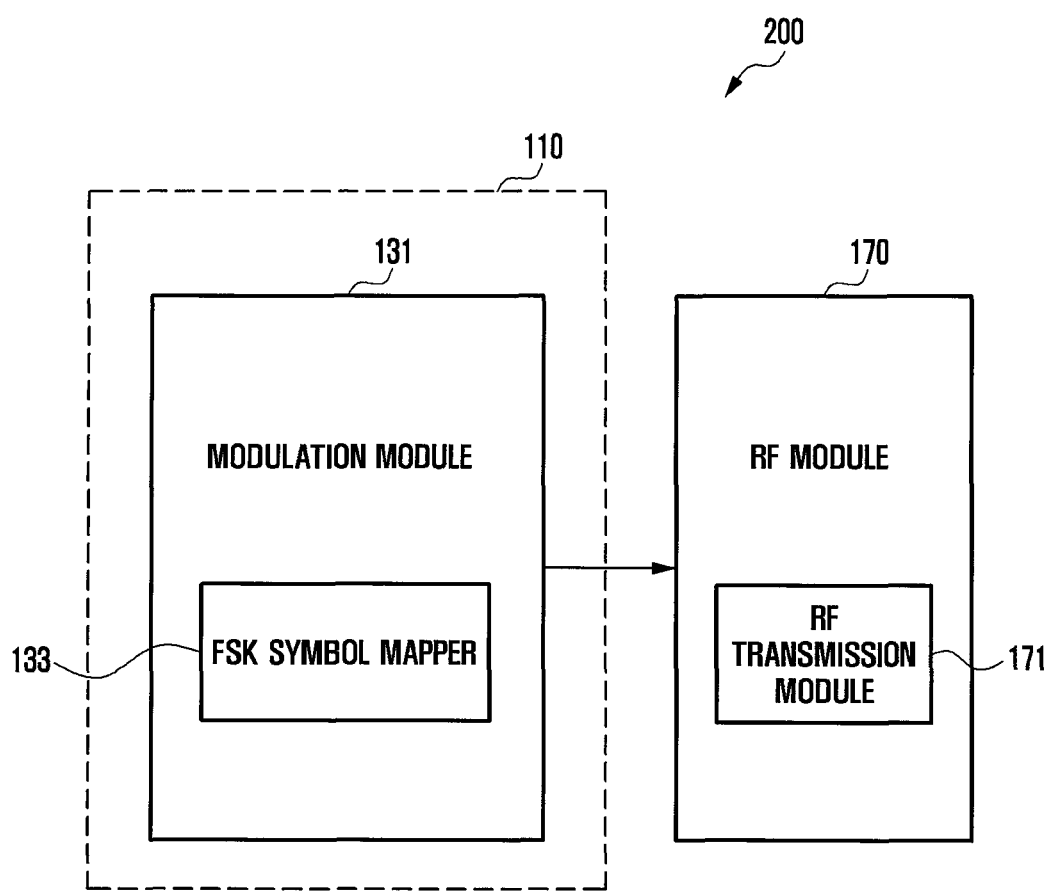
FIG. 4 is an exemplified diagram illustrating a transmitting device according to an embodiment of the present invention.

FIG. 4 is an exemplified diagram illustrating a transmitting device according to an embodiment of the present invention.

A transmitting device 200 may include a controller 110 and a radio frequency (RF) module 170. The controller 110 may include a modulation module 131.

The controller 110 may be configured of a hardware module including a microprocessor, a central processing unit (CPU), a memory, or the like, a software module, or a combination of the hardware and the software. Further, the controller 110 may also be configured of the CPU included in the electronic device and a communication module or a modem chip that is separately configured. In addition, the controller 110 may be variously configured by including the modulation module 131 and the RF module 170, or by being combined with other hardware module or software module.

The RF module 170 may include an RF transmission module 171. The RF transmission module 171 may transmit a QAM signal of a first symbol corresponding to the FQAM mode through a first antenna, and transmit a QAM signal of a second symbol corresponding to the QAM mode through a second antenna. The RF transmission module 171 may include a power amplifier amplifying intensity of the modulated signal. Further, the RF transmission module 171 may further include multiple antennas including the first antenna and the second antenna.

The modulation module 131 may map the QAM signal of the first symbol to one frequency tone among the preset number of frequency tones according to an FSK signal of the first symbol and map the QAM signal of the second symbol to the frequency tone to which the first symbol is mapped.

Further, the modulation module 131 may include an FSK symbol mapper 133. The FSK symbol mapper 133 may designate one frequency tone corresponding to the FSK signal of the first symbol among the preset number of frequency tones and map the QAM signal of the first symbol and the QAM signal of the second symbol to the designated frequency tone.

For example, in the FQAM resource element 231 in (a) of FIG. 2, one activation tone 233 may be designated corresponding to the FSK signal of the first symbol and the QAM signal of the first symbol and the QAM signal of the second symbol may be mapped to the designated activation tone 233. In the FQAM resource element 231, the symbol may not be mapped to at least one remaining tone other than the activation tone 233.

Figure 5:
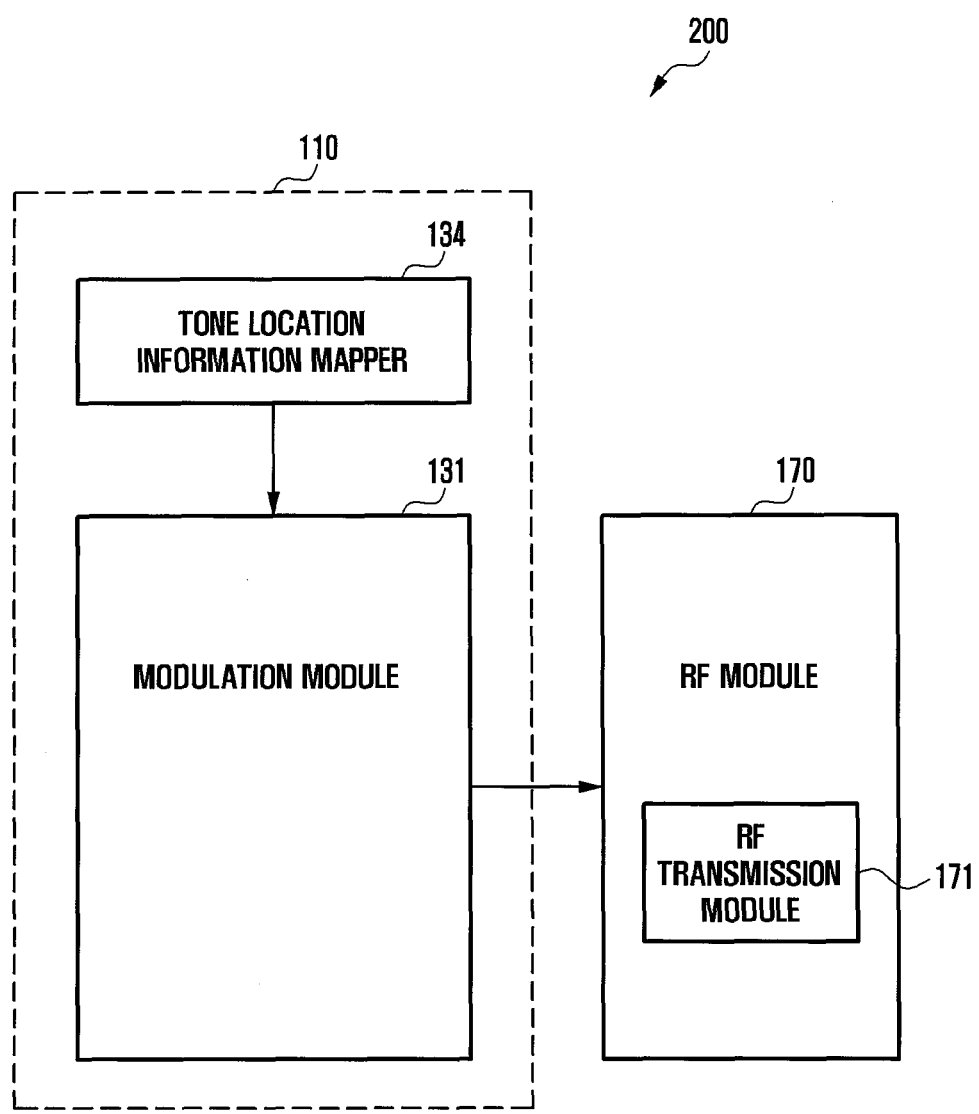
FIG. 5 is another exemplified diagram illustrating a transmitting device according to an embodiment of the present invention.

FIG. 5 is another exemplified diagram illustrating a transmitting device according to an embodiment of the present invention.

A transmitting device 200 may include a controller 110 and a radio frequency (RF) module 170. The controller 110 may include a tone location information mapper 134.

The RF module 170 may include an RF transmission module 171. The RF transmission module 171 may transmit a QAM signal of a first symbol corresponding to the QAM mode through a first antenna, and transmit a QAM signal of a second symbol corresponding to the QAM mode through a second antenna.

The tone location information mapper 134 may map the QAM signal of the first symbol to one frequency tone among the preset number of frequency tones according to tone location information and map the QAM signal of the second symbol to the frequency tone to which the QAM signal of the first symbol is mapped.

Further, the controller 110 may further include a modulation module 131. The modulation module 131 may modulate the first symbol corresponding to the QAM mode to acquire the QAM signal of the first symbol, and modulate the second symbol corresponding to the QAM mode to acquire the QAM signal of the second symbol.

Tone location information on the frequency tone to which the QAM signal of the first symbol and the QAM signal of the second symbol are mapped among the preset number of frequency tones may be used as information or data for demodulation together with QAM constellation information of at least one of the first symbol and the second symbol.

Further, as described with reference to FIGS. 2 and 3, the tone location information of the frequency tone carrying the signal in a receiving device corresponding to the transmitting device 200 may not be a demodulated data. As an example, the tone location information mapper 134 may also perform a function of designating while dividing an activation tone and a null tone for basic resource elements belonging to a resource block according to a preset sequence, or the like when a modulated signal (or symbol) and a resource block are mapped, in order to exhibiting the non-Gaussian interference characteristic in the system.

Figure 6:
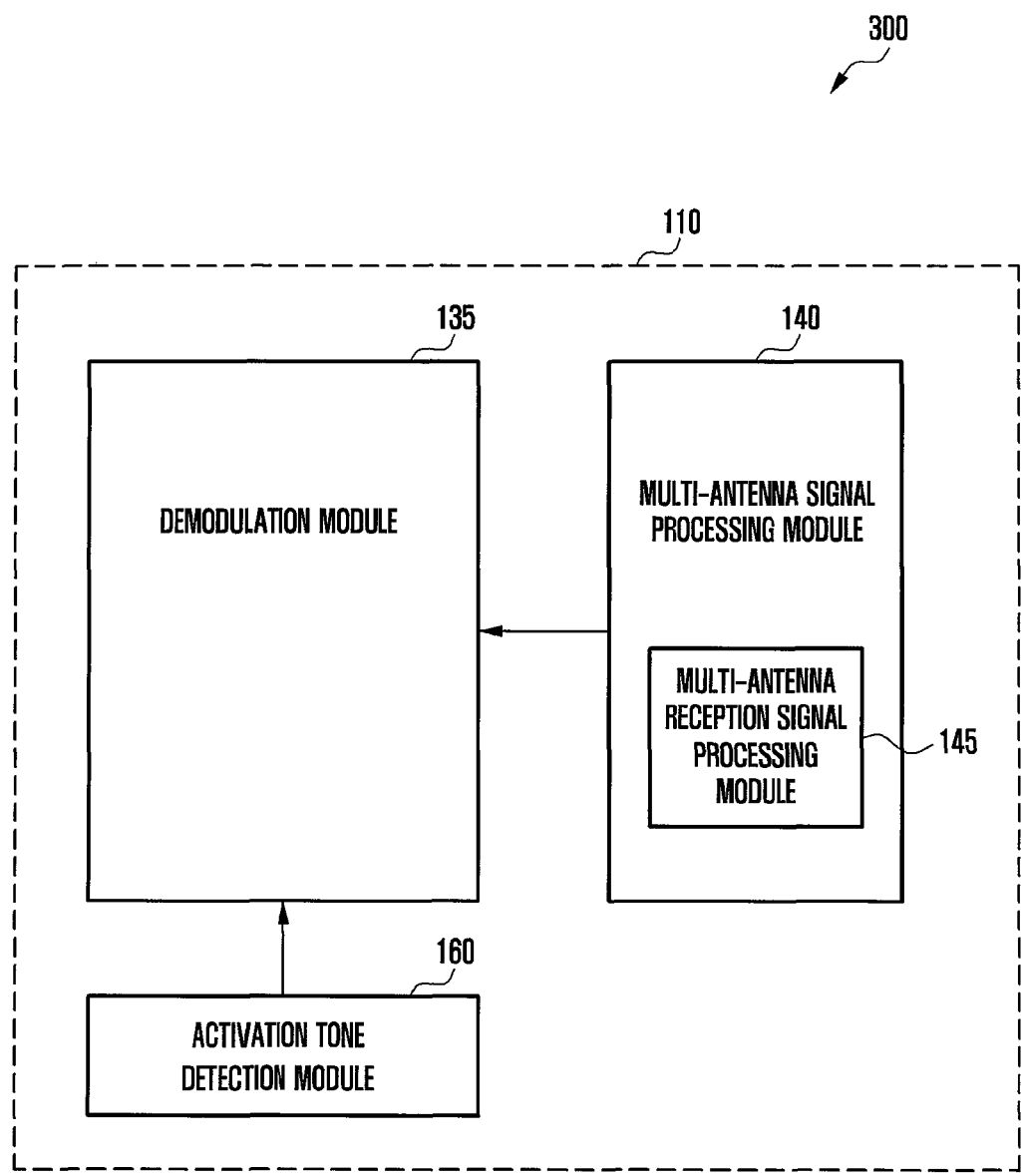
FIG. 6 is an exemplified diagram illustrating a receiving device according to an embodiment of the present invention.

FIG. 6 is an exemplified diagram illustrating a receiving device according to an embodiment of the present invention.

A receiving device 300 may include a controller 110. The control unit 110 may include a demodulation module 135, a multi-antenna signal processing module 140, and an activation tone detection module 160.

The multi-antenna signal processing module 140 may include a multi-antenna reception signal processing module 145. The multi-antenna reception signal processing module 145 may spatially divide at least one channel among a plurality of channels from a received signal. The received signal is a signal transmitted through multiple antennas toward the transmitting device corresponding to the receiving device 300, and may be a signal received through the plurality of channels. Further, the received signal may be received through at least one antenna or multiple antennas provided in the receiving device 300.

The activation tone detection module 160 may detect tone location information on one activated frequency tone among the preset number of frequency tones of the received signal.

For example, one activation tone 233 in which a signal for at least one symbol is transmitted may be detected in the FQAM resource element 231 in (a) of FIG. 2.

Further, the activation tone detection module 160 may also be included in the demodulation module 135. In this case, the activation tone detection module 160 may be operated as an FSK symbol demapper in the demodulation module 135.

The demodulation module 135 may demodulate at least one QAM signal received through at least one channel in the activated frequency tone. Further, the demodulation module 135 may acquire a bit stream based on the tone location information of the frequency tone and at least one demodulated QAM signal.

Figure 7:
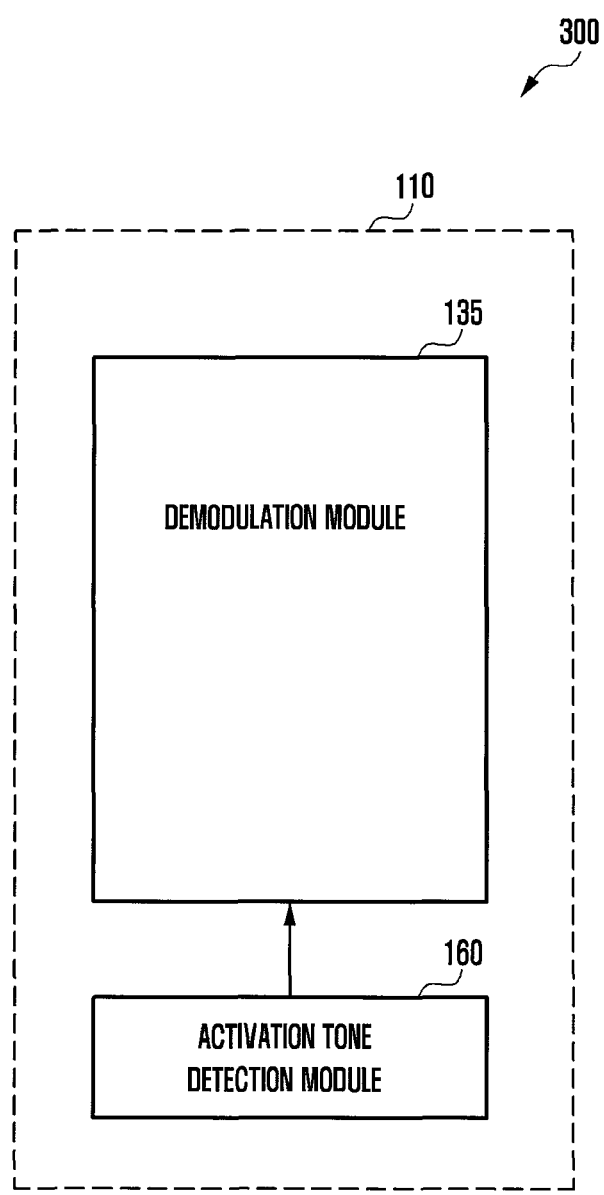
FIG. 7 is another exemplified diagram illustrating a receiving device according to an embodiment of the present invention.

FIG. 7 is another exemplified diagram illustrating a receiving device according to an embodiment of the present invention.

A receiving device 300 may include a controller 110. The control unit 110 may include a demodulation module 135 and an activation tone detection module 160.

The activation tone detection module 160 may detect tone location information of one activated frequency tone carrying a modulated signal among the preset number F of frequency tones.

The demodulation module 135 may demodulate QAM signals having a level number Q received through channels from a first channel to N-th channel that are spatially divided in the activated frequency tone to acquire a bit stream having a level number M (here, $M=FQ^N$) based on tone location information of the activated frequency tone and the demodulated QAM signals.

For example, when a plurality of QAM signals are transmitted through one resource block by a signal user multiple input multiple output (MIMO) scheme, the receiving device 300 may receive the plurality of transmitted QAM signals.

Further, when describing an equation representing the level number M based on the transmitting device corresponding to the receiving device 300, F is a level number that may represent tone location information of the tone to which a signal is mapped among the preset number of frequency tones, and Q may represent a QAM level number that the QAM signals of N symbols identically have in the mapped frequency tone.

In addition, the receiving device 300 may also selectively demodulate at least one QAM signal received through at least one (the preset number) channel among N channels to acquire a bit stream based on the tone location information of the activated frequency tone and at least one selectively demodulated QAM signal. As an example, a case in which the receiving device 300 is a portable terminal, the transmitting device corresponding to the receiving device 300 is a base station, and the base station transmits a plurality of QAM signals through one resource block by a multi user multiple input multiple output (MIMO) scheme, may be assumed. In this case, the portable terminal may perform an operation of receiving one QAM signal or the preset number of QAM signals among the plurality of QAM signals.

Figure 8:
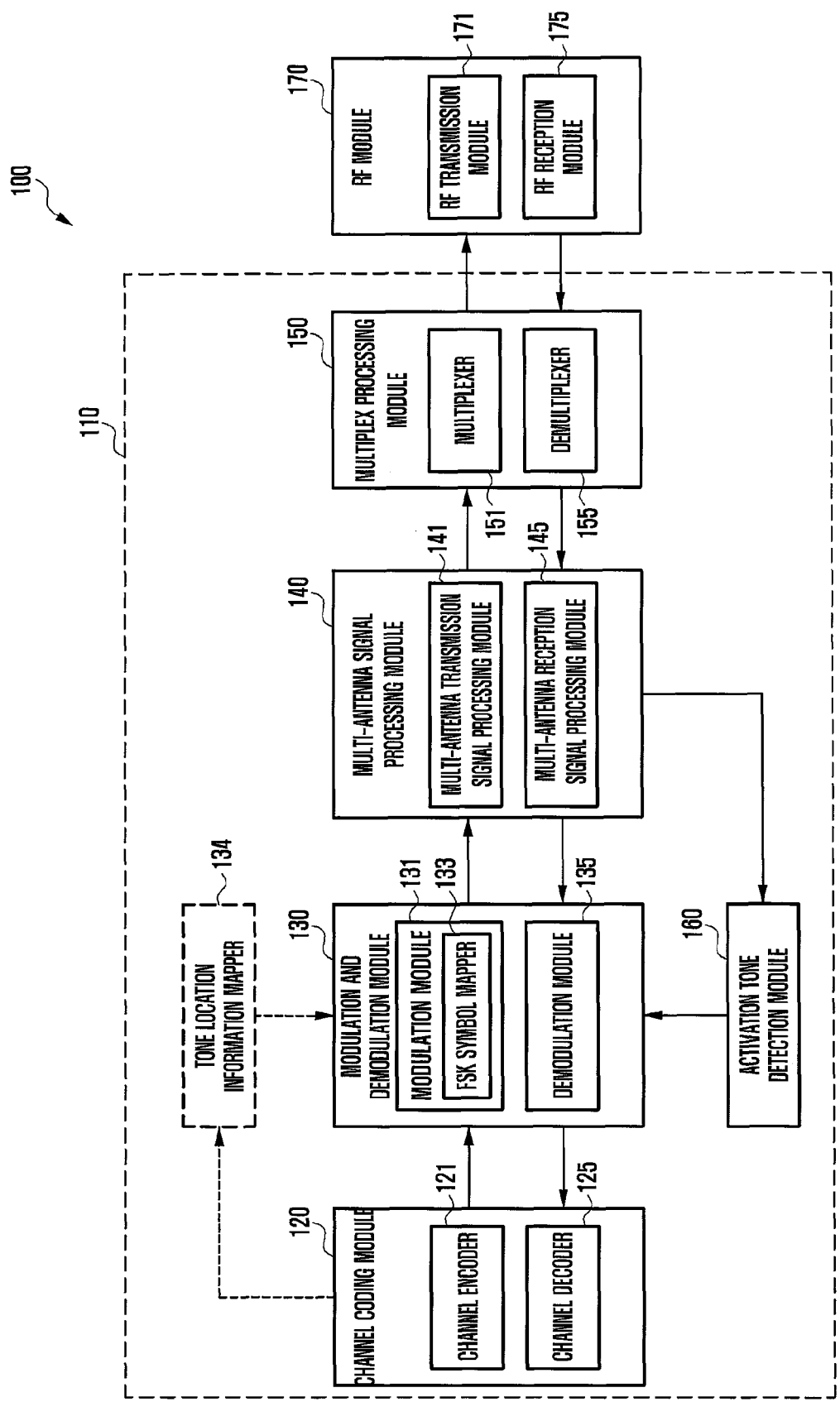
FIG. 8 is an exemplified diagram illustrating an electronic device according to an embodiment of the present invention.

FIG. 8 is an exemplified diagram illustrating an electronic device according to an embodiment of the present invention.

An electronic device 100 may include a transmitting device 200 and a receiving device 300. The electronic device 100 may include a controller 110 and an RF module 170.

The controller 110 may include a channel coding module 120, a modulation and demodulation module 130, a multi-antenna signal processing module 140, and a multiplex processing module 150. The controller 110 may further include an activation tone detection module 160. The controller 110 may further include a tone location information mapper 134.

The channel coding module 120 may include a channel encoder 121 and a channel decoder 125. The channel encoder 121 may perform channel encoding on a bit stream of data to have an error correcting or restoring function using a binary channel code, a non-binary channel code, or the like. The channel encoder 121 may channel encode a bit stream to acquire a channel-encoded bit stream.

The channel decoder 125 may decode the channel-encoded bit stream that is received from the modulation and demodulation module 130 to acquire the bit stream of the data.

The modulation and demodulation module 130 may include a modulation module 131 and a demodulation module 135. The modulation module 131 may perform constellation mapping on the channel-encoded bit stream that is received from the channel coding module 120 depending on a modulation mode.

The modulation module 131 may map a QAM signal of a first symbol to one frequency tone among the preset number of frequency tones and map a QAM signal of a second symbol to the frequency tone to which the QAM signal of the first symbol is mapped.

Further, the modulation module 131 may include an FSK symbol mapper 133. When the first symbol corresponds to the FQAM mode, the FSK symbol mapper 133 may designate one frequency tone corresponding to an FSK signal of the first symbol among the preset number of frequency tones and map the QAM signal of the first symbol and the QAM signal of the second symbol to the designated frequency tone.

Further, the controller 110 may further include a tone location information mapper 134. When the first symbol corresponds to the QAM mode, the tone location information mapper 134 may designate one frequency tone among the preset number of frequency tones according to tone location information of a frequency tone used as information for demodulation and map the QAM signal of the first symbol and the QAM signal of the second symbol to the designated frequency tone. Further, the tone location information mapper 134 may also acquire the tone location information through a separate path or autonomously designate a location through a preset sequence or the like without receiving the tone location information from the channel coding module 120.

The demodulation module 135 may demodulate a signal received from the multi-antenna signal processing module 140 depending on a modulation mode to acquire a channel-encoded bit stream. The demodulation module 135 may demodulate at least one signal received through at least one channel in the activated frequency tone.

Further, the controller 110 may further include an activation tone detection module 160. The activation tone detection module 160 may detect tone location information on one activated frequency tone among the preset number of frequency tones of the received signal. Further, the demodulation module 135 may acquire a bit stream based on the tone location information of the activated frequency tone and at least one demodulated signal.

The multi-antenna signal processing module 140 may include a multi-antenna transmission signal processing module 141 and a multi-antenna reception signal processing module 145. The multi-antenna transmission signal processing module 141 may perform multi-antenna signal processing on a modulated signal (or symbol) using a scheme such as a spatial multiplexing scheme, a spatial time block code scheme, a spatial frequency block code scheme, or the like. Further, the multi-antenna transmission signal processing module 141 may perform multi-antenna signal processing based on a codebook, channel state information, channel quality information, or the like that is received from the receiving device corresponding to the electronic device 100. Further, the multi-antenna transmission signal processing module 141 may perform multi-antenna signal processing according to the single user MIMO scheme or the multi user MIMO scheme.

The multi-antenna reception signal processing module 145 may spatially divide at least one channel among a plurality of channels from a signal received from the multiplex processing module 150. The multi-antenna reception signal processing module 145 may perform reception signal processing by a scheme corresponding to the transmission signal processing scheme. As the multi-antenna reception signal processing scheme, maximum ratio combining (MRC), minimum mean square error (MMSE), MMSE-successive interference cancellation (MMSE-SIC), zero-forcing (ZF), or the like may be used.

The multiplex processing module 150 may include a multiplexer 151 and a demultiplexer 155. A multiplexing scheme used in the multiplex processing module 150 may include the OFDM scheme, the SC-OFDM scheme, the FDM scheme, or the like. As an example, in a case of the OFDM scheme, the multiplexer 151 may include inverse fast Fourier transform (IFFT), and the demultiplexer 155 may include fast Fourier transform (FFT).

The RF module 170 may include an RF transmission module 171 and an RF reception module 175. The RF module may further include at least one antenna for wirelessly propagating or receiving a signal. The RF transmission module 171 may include a power amplifier amplifying the modulated signal. The RF reception module 175 may include a low noise amplifier amplifying the signal received from the antenna.

In the electronic device 100 or the transmitting device 200 described above or to be described below, designating one frequency among the preset number of frequency tones according to the FSK signal of the first symbol corresponding to the FQAM mode or mapping the QAM signal of the second symbol corresponding to the QAM mode to the designated frequency in the modulation and demodulation module 130, the modulation module 131, or the FSK symbol mapper 133 may be performed on a signal (or symbol) that is multi-antenna transmission signal processed in the multi-antenna transmission signal processing module 141 of the multi-antenna signal processing module 140. In this case, for example, the electronic device 100 or the transmitting device 200 may further include a resource mapper (not illustrated) positioned between the multi-antenna transmission signal processing module 141 and the multiplexer 151 and mapping the QAM signals to the frequency.

Further, in the electronic device 100 or the transmitting device 200, designating one frequency among the preset number of frequency tones according to the tone location information in the tone location information mapper 134 may be performed on a signal (or symbol) that is multi-antenna transmission signal processed in the multi-antenna transmission signal processing module 141 of the multi-antenna signal processing module 140. In this case, as an example, a position of the tone location information mapper 134 or signal flow may be changed in the electronic device 100 illustrated in FIG. 8.

Further, in the electronic device 100 or the receiving device 300, detecting tone location information on one activated frequency tone among the preset number of frequency tones from a received signal in the modulation and demodulation module 130, the demodulation module 135, the FSK symbol demapper included in the demodulation module 135, or the activation tone detection module 160 may be performed on a signal demultiplexed in the demultiplexer 155 of the multiplex processing module 150 before the multi-antenna reception signal processing in the multi-antenna reception signal processing module 145. In this case, for example, in the electronic device 100 or the receiving device 300, a position of the activation tone detection module 160 or signal flow illustrated in FIG. 8 may be changed. Further, the electronic device 100 or the receiving device 300 may further include a resource demapper (not illustrated) positioned between the multi-antenna reception signal processing module 145 and the demultiplexer 155 and detecting the tone location information on the activated frequency tone.

Further, in the electronic device 100, the transmitting device 200, or the receiving device 300, it should be noted that a position of modules or components included in the corresponding device or signal flow may be changed. For example, positions of the modulation and demodulation module 130 and the multi-antenna signal processing module 140 may be exchanged with each other, accordingly, an order of operations for transmission signal processing or reception signal processing through the modules may also be changed.

Figure 9:
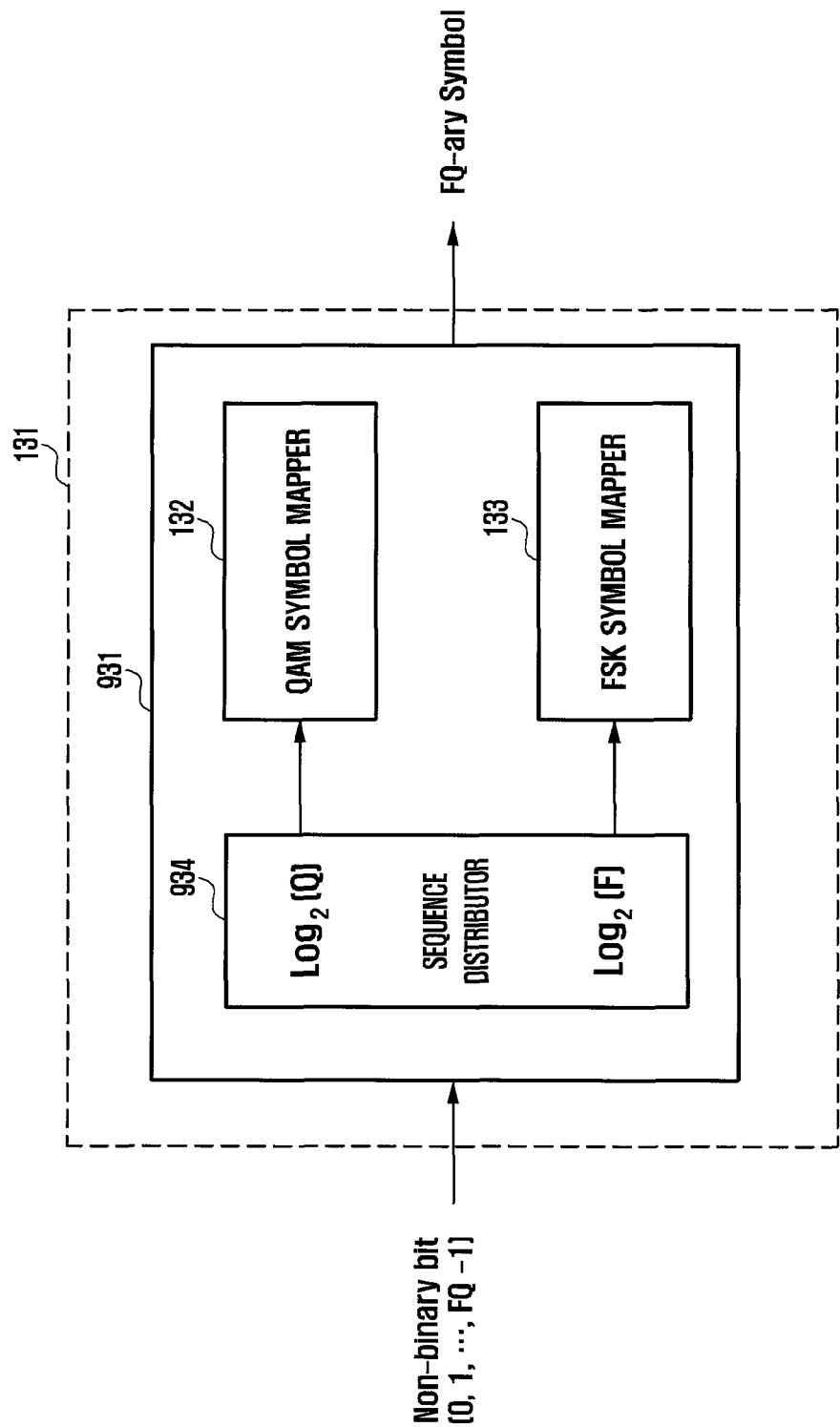
FIG. 9 is an exemplified diagram illustrating a modulation module in more detail according to an embodiment of the present invention.

FIG. 9 is an exemplified diagram illustrating a modulation module in more detail according to an embodiment of the present invention.

For example, the modulation module 131 may include an FQAM modulator 931. The FQAM modulator 931 may include a QAM symbol mapper 132 and an FSK symbol mapper 133.

Further, the FQAM modulator 931 may further include a sequence distributor 934 for distributing a non-binary bit stream when the non-binary bit stream is received from the channel coding module 120. In the FQAM mode used in the FQAM modulator 931, a level number FQ may be obtained according to a level number F of the FSK and a level number Q of the QAM. The sequence distributor 934 may distribute a sequentially input non-binary bit stream as a bit stream to be transmitted to the QAM symbol mapper 132, and a bit stream to be transmitted to the FSK symbol mapper 133, according to the level number F of the FSK and the level number Q of the QAM.

The QAM symbol mapper 132 may map the bit stream received from the sequence distributor 934 to a constellation of a QAM signal having the level number Q depending on a value of the bit stream, thereby acquiring a QAM signal modulated in the QAM mode.

The FSK symbol mapper 133 may map the bit stream received from the sequence distributor 934 to a constellation of an FSK signal having the level number F depending on a value of the bit stream. Further, mapping, by the FSK symbol mapper 133, to the constellation of the FSK signal may be an operation of determining an activation tone carrying a QAM signal output from the QAM symbol mapper 132 in the FQAM resource element or resource block having F frequency tones (or F basic resource elements) depending on a value of the received bit stream.

For example, when the first symbol corresponding to the FQAM mode is modulated, the FSK symbol mapper 133 may designate an activation tone among the FQAM resource elements (or resource blocks) according to the FSK signal of the first symbol. The designated activation tone may carry the QAM signal of the first symbol to be transmitted through the first antenna. Further, the FSK symbol mapper 133 may perform a control so that the activation tone carrying the QAM signal of the first symbol is also designated as the frequency tone carrying the QAM signal of the second symbol corresponding to the QAM mode. Therefore, the QAM signal of the first symbol and the QAM signal of the second symbol mapped to one activation tone among the FQAM resource element may be transmitted together through multiple antennas.

Figure 15:
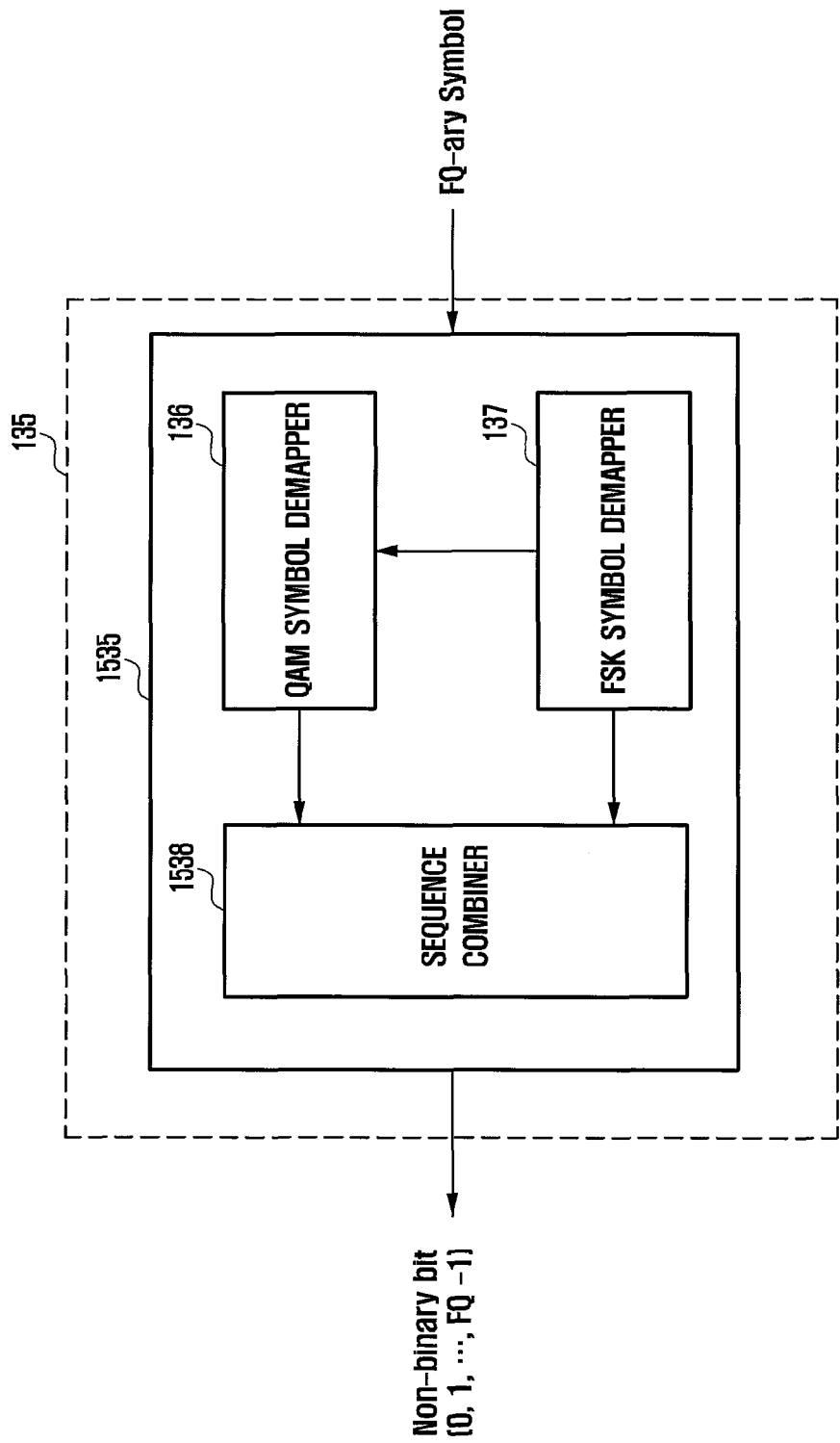
FIG. 15 is an exemplified diagram illustrating a demodulation module in more detail according to an embodiment of the present invention.

FIG. 15 is an exemplified diagram illustrating a demodulation module in more detail according to an embodiment of the present invention.

For example, the demodulation module 135 may include an FQAM demodulator 1535. The FQAM demodulator 1535 may include a QAM symbol demapper 136 and an FSK symbol demapper 137. In the FQAM mode used in the FQAM demodulator 1535, a level number FQ may be obtained according to a level number F of the FSK and a level number Q of the QAM.

The FSK symbol demapper 137 may perform demodulation according to the FSK constellation of a signal received from the multi-antenna reception signal processing module 145 to acquire a bit stream having the level number F. The bit stream having the level number F may be tone location information of an activation tone carrying the QAM signal among the frequency tones (or basic resource elements) belonging to the FQAM resource element. The FSK symbol demapper 137 may transmit information on the activation tone carrying the QAM signal to the QAM symbol demapper 136.

The QAM symbol demapper 136 may demodulate a signal according to the QAM signal constellation in the activation tone to acquire a bit stream having the level number Q.

Further, the FQAM demodulator 1535 may further include a sequence combiner 1538 combining bit streams received from each of the QAM symbol demapper 136 and the FSK symbol demapper 137 to each other to acquire a non-binary bit stream when a symbol modulated by the FQAM mode is received from the multi-antenna signal processing module 140. As an example, the sequence combiner 1538 may receive the bit streams from the QAM symbol demapper 136 and the FSK symbol demapper 137 to acquire a bit stream consisting of a series of bits.

Further, the FSK symbol mapper 133 may perform the same function as that of the activation tone detection module 160 in FIG. 8. Further, the activation tone detection module 160 may include the FSK symbol mapper 133 or may have the same component as that of the FSK symbol mapper 133. The FSK symbol mapper 133 may detect tone location information on one activated frequency tone among the preset number of frequency tones of the received signal.

Further, when a plurality of modulated signals are mapped to one frequency tone among the FQAM resource elements and transmitted together through the multiple antennas, the demodulation module 135 or the FQAM demodulation module 1535 of the receiving device 300 corresponding to the transmitting device 200 may include a plurality of QAM symbol demappers including the QAM symbol demapper 136. In this case, the FSK symbol mapper 133 (or the activation tone detection module 160) may transmit tone location information on the activation tone at the same location to at least one QAM symbol demapper including the QAM symbol demapper 136.

Hereinafter, an operation and a device for transmitting and receiving a signal on the basis of multiple antennas in FIGS. 10 to 14, and 16 to 19 will be described with reference to exemplified diagrams for describing a concept in which a symbol is mapped to a frequency tone illustrated in FIGS. 20 to 27.

Resources illustrated in FIGS. 20 to 27 may represent FQAM resource elements (or resource blocks). The number of frequency tones (or basic resource elements) belonging to the FQAM resource element may be a level number of an FSK signal for an FQAM symbol, or a level number of tone location information. As an example, the FQAM resource elements illustrated in FIGS. 20 to 27 that correspond to 2-FSK, may include two frequency tones.

Figure 20:
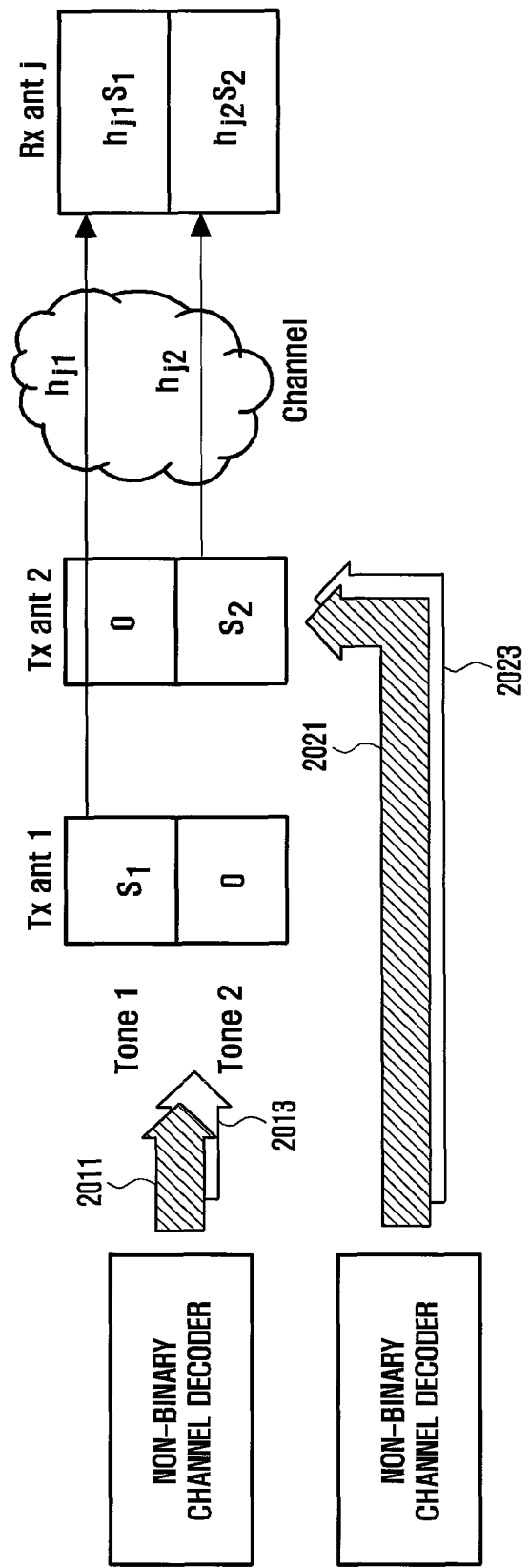
FIG. 20 is an exemplified diagram for describing a concept in which a symbol is mapped to a frequency tone according to an embodiment of the present invention.

FIG. 20 is an exemplified diagram for describing a concept in which a symbol is mapped to a frequency tone according to an embodiment of the present invention.

For example, the transmitting device 200 may channel encode a first bit stream and a second bit stream for two codewords using a non-binary channel code, respectively, modulate a first symbol (e.g. $S_1$) by 2F4QAM mode from the channel-encoded first bit stream, and modulate a second symbol (e.g. $S_2$) by the 2F4QAM mode from the channel-encoded second bit stream.

A QAM signal 2011 of the first symbol may be mapped 2013 to a frequency tone according to an FSK signal of the first symbol, and a QAM signal 2021 of the second symbol may be mapped 2023 to a frequency tone according to an FSK signal of the second symbol. Here, the mapping 2013 and the mapping 2023 may be irrelevant from each other. In this case, since both of two frequency tones belonging to the FQAM resource element may be used in the system, interference in corresponding frequency band may have the Gaussian characteristic, or the non-Gaussian characteristic may deteriorate.

The transmitting device 200 may transmit the QAM signal of the first symbol through a first antenna, and transmit the QAM signal of the second symbol through a second antenna. A level number of the FQAM modulated symbol may be FQ that is a product of the level number F of the FSK signal of the symbol and the level number Q of the QAM signal of the symbol. When the FQAM first symbol of the FQ level and the FQAM second symbol of the FQ level are transmitted together, a level number of transmitted signal may be $F^2Q^2$.

The receiving device 300 may receive a signal corresponding to the QAM signal of the first symbol transmitted and went through a channel $H_{J1}$ (e.g. $H_{J1}*S_1$), and a signal corresponding to the QAM signal of the second symbol transmitted and went through a channel $H_{J2}$ (e.g. $H_{J2}*S_2$).

Figure 10:
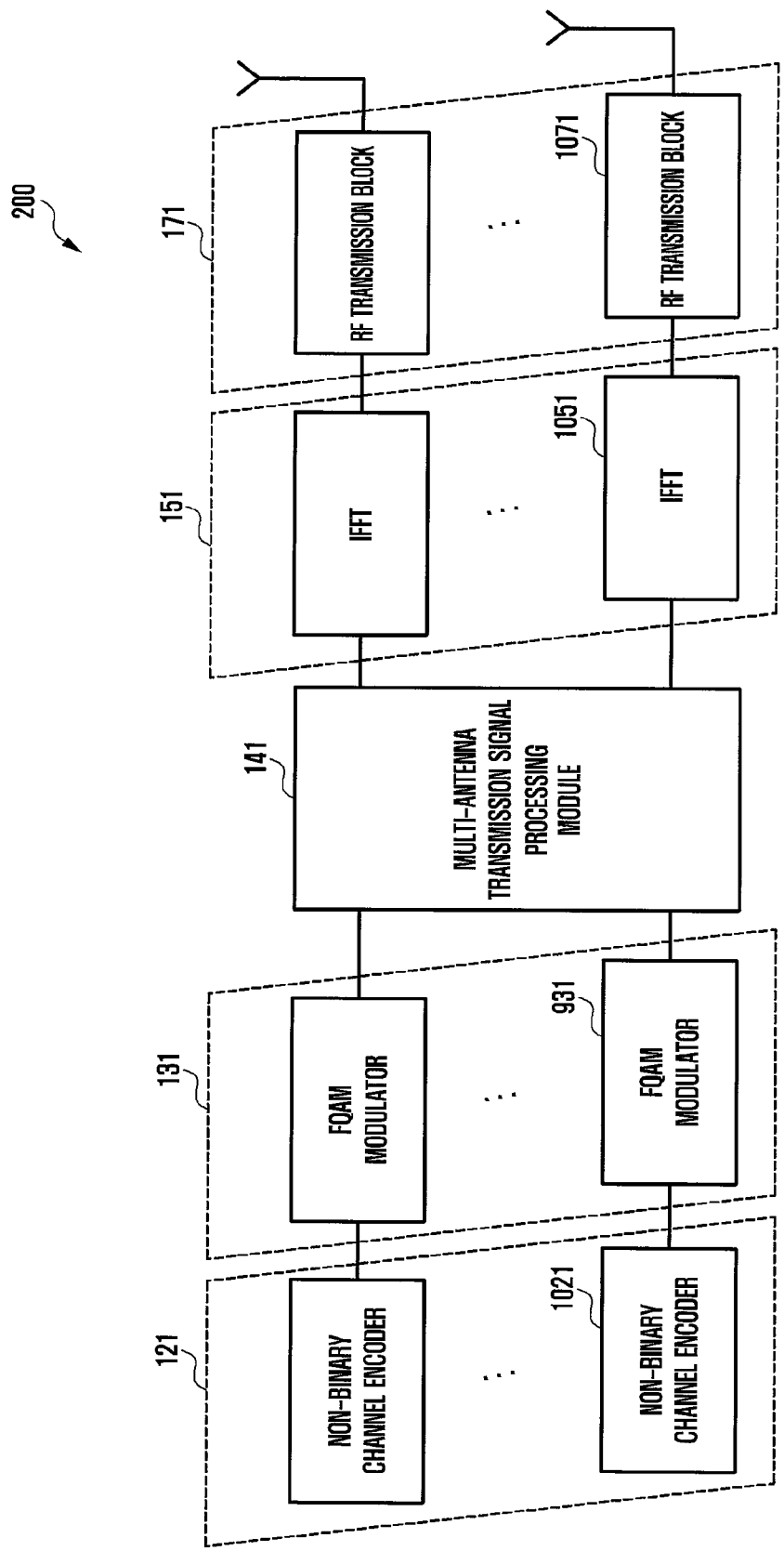
FIG. 10 is an exemplified diagram illustrating a transmitting device in more detail according to an embodiment of the present invention.

For example, referring to FIG. 10, the transmitting device 200 may include a channel encoder 121, a modulation module 131, a multi-antenna transmission signal processing module 141, a multiplexer 151, and an RF transmission module 171.

The channel encoder 121 may include at least one non-binary channel encoder 1021 performing channel encoding by a non-binary code scheme. The number of at least one non-binary channel encoder 1021 may be determined depending on the number of transmitted codewords. As an example, the number of codewords may correspond to the number of data links, the number of receiving devices (or user) corresponding to the transmitting device 200, the number of antennas that are logically divided, or the number of channels that are spatially divided.

The modulation module 131 may include at least one FQAM modulator 931 receiving at least one bit stream that is received from the channel encoder 121 and modulating the bit stream by the FQAM mode. As an example, the number of at least one FQAM modulator 131 may be identical to or larger than the number of non-binary channel encoder 1021 included the channel encoder 121. Further, the number of at least one FQAM modulator 131 may correspond to the number of data links, the number of receiving devices (or user) corresponding to the transmitting device 200, the number of antennas that are logically divided, or the number of channels that are spatially divided.

The multi-antenna transmission signal processing module 141 may perform multi-antenna signal processing on a demodulated signal using a scheme such as the spatial multiplexing scheme, the space time block code scheme, the space frequency block code scheme, or the like.

The multiplexer 151 may include at least one IFFT 1051.

The RF transmission module 171 may include at least one RF transmission block 1071.

The number of at least one IFFT 1051 or the number of at least one RF transmission block 1071 may correspond to the number of physical antennas, the number of logical antennas, or the number of channels that are spatially divided.

Figure 16:
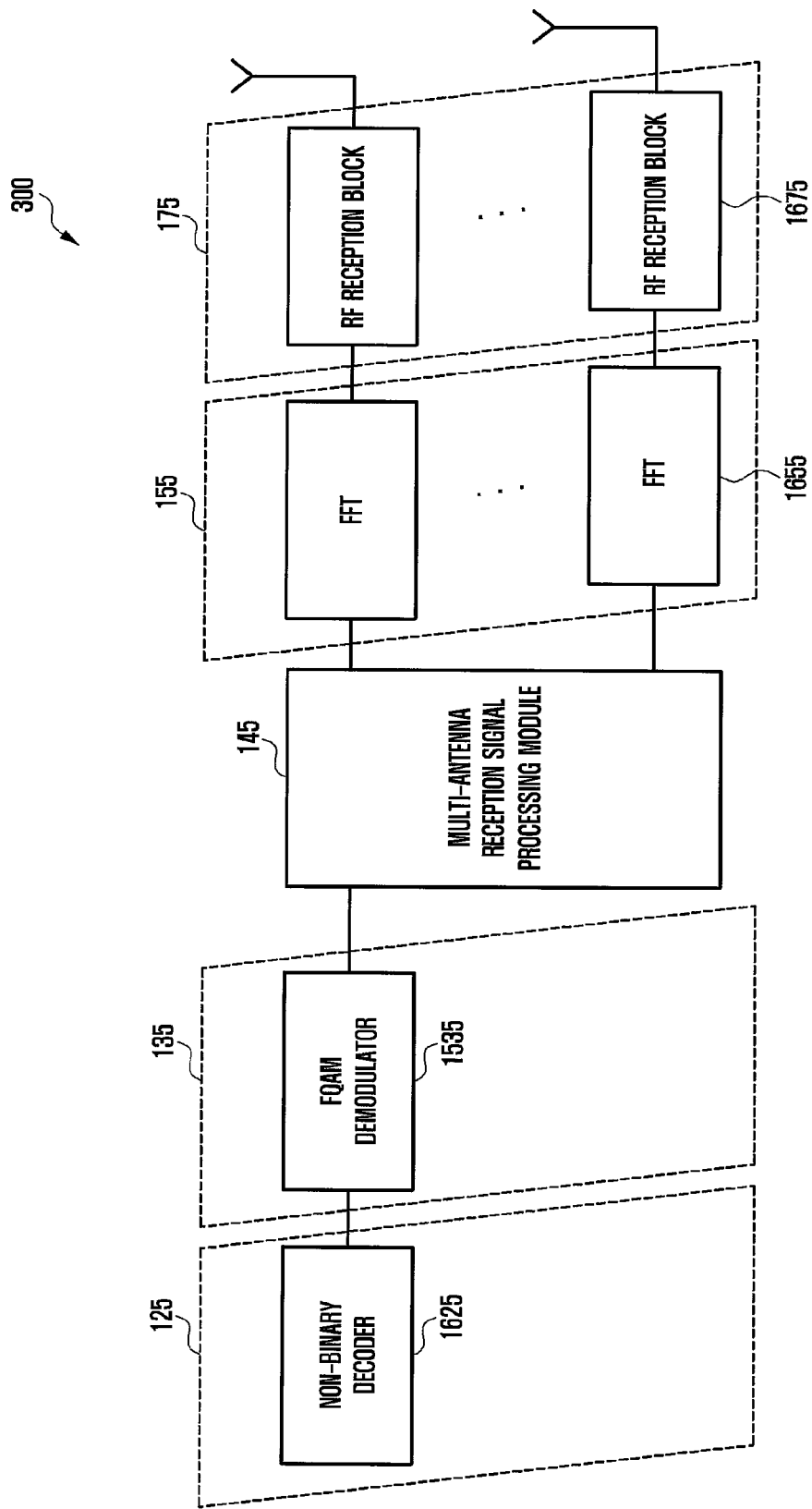
FIG. 16 is a receiving device in more detail according to an embodiment of the present invention.
Figure 17:
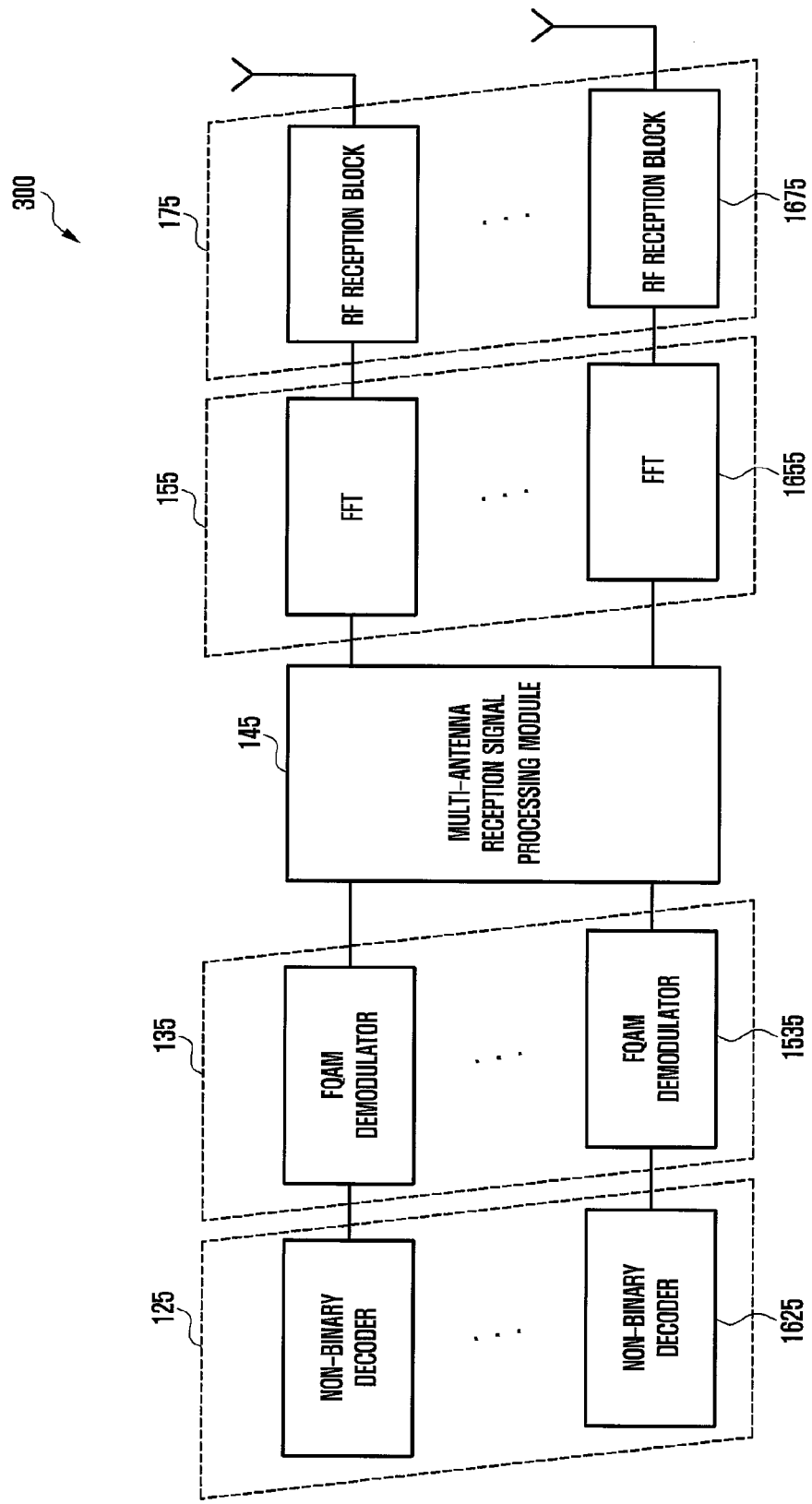
FIG. 17 is another exemplified diagram illustrating a receiving device in more detail according to an embodiment of the present invention.

For example, referring to FIGS. 16 and 17, the receiving device 300 may include a channel decoder 125, a demodulation module 135, a multi-antenna reception signal processing module 145, a demultiplexer 155, and an RF reception module 175.

The RF reception module 175 may include at least one RF reception block 1675.

The demultiplexer 155 may include at least one FFT 1655.

The multi-antenna reception signal processing module 145 may perform reception signal processing by a scheme corresponding to the multi-antenna transmission signal processing scheme.

The demodulation module 135 may include at least one FQAM demodulator 1535. The number of FQAM demodulator 1535 included in the demodulation module 135 may correspond to the number of FQAM modulated codeword to be received by the receiving device 300.

For example, in FIG. 16, there may be one FQAM demodulator 1535 as the demodulation module 135. When the transmitting device 200 illustrated in FIG. 10 transmits a plurality of codewords using the multi-user MIMO scheme, the receiving device 300 may receive some of the plurality of codewords. The codeword that is not decoded in the receiving device 300 may be transmitted for other receiving device. The channel decoder 125 may include one non-binary channel decoder 1625.

For example, in FIG. 17, there may be a plurality of FQAM demodulators including the FQAM demodulator 1535 as the demodulation module 135. When the transmitting device 200 illustrated in FIG. 10 transmits a plurality of codewords using the single-user MIMO scheme, the receiving device 300 may receive the plurality of codewords. The channel decoder 125 may include a plurality of non-binary channel decoders including the non-binary channel decoder 1625, which perform channel decoding on a bit stream received from the plurality of FQAM demodulators.

Figure 21:
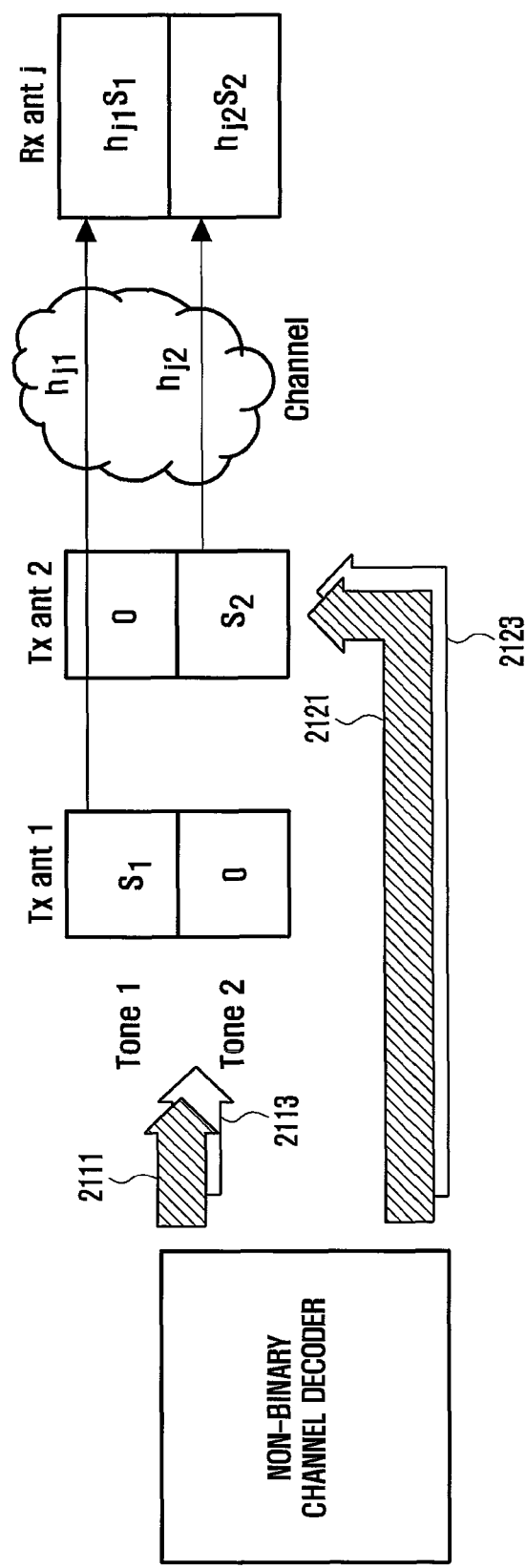
FIG. 21 is another exemplified diagram for describing a concept in which a symbol is mapped to a frequency tone according to an embodiment of the present invention.

FIG. 21 is another exemplified diagram for describing a concept in which a symbol is mapped to a frequency tone according to an embodiment of the present invention.

For example, the transmitting device 200 may channel encode a bit stream for one codeword using a non-binary channel code, and distribute the channel-encoded bit stream as a first bit stream and a second bit stream. The transmitting device 200 may modulate a first symbol (e.g. $S_1$) by the 2F4QAM mode from the first bit stream, and modulate a second symbol (e.g. $S_2$) by the 2F4QAM mode from the second bit stream.

A QAM signal 2111 of the first symbol may be mapped 2113 to a frequency tone according to an FSK signal of the first symbol, and a QAM signal 2121 of the second symbol may be mapped 2123 to a frequency tone according to an FSK signal of the second symbol. Here, the mapping 2113 and the mapping 2123 may be irrelevant from each other. The transmitting device 200 may transmit the modulated first symbol through a first antenna and transmit the modulated second symbol through a second antenna, using at least one activation tone in the FQAM resource.

For example, referring to FIG. 10, the transmitting device 200 may include a channel encoder 121, a modulation module 131, a multi-antenna transmission signal processing module 141, a multiplexer 151, and an RF transmission module 171.

The channel encoder 121 may include one non-binary channel encoder 1021 performing channel encoding by a non-binary code scheme. The modulation module 131 may include at least one FQAM modulator 931 receiving a bit stream and modulating the bit stream by the FQAM mode.

The non-binary channel encoder 1021 may distribute the bit stream depending on the number of at least one FQAM modulator 931 and transmit the distributed bit stream to at least one FQAM modulator 931, respectively.

Components and operations of the transmitting device 200 in FIG. 21 may be similar to or the same as those in FIG. 10 illustrated for describing FIG. 20, therefore, detailed description therefor will be omitted.

The receiving device 300 may receive a signal corresponding to the QAM signal of the first symbol transmitted and went through a channel $H_{f1}$ (e.g. $H_{f1}*S_1$), and a signal corresponding to the QAM signal of the second symbol transmitted and went through a channel $H_{f2}$ (e.g. $H_{f2}*S_2$).

For example, referring to FIGS. 16 and 17, the receiving device 300 may include a channel decoder 125, a demodulation module 135, a multi-antenna reception signal processing module 145, a demultiplexer 155, and an RF reception module 175.

In FIG. 17, the channel decoder 125 may include one non-binary channel decoder 1625. The non-binary channel decoder 1625 may combine bit streams (or demodulated signals) received from a plurality of FQAM demodulators including the FQAM demodulator 1535 to acquire one bit stream. The non-binary channel decoder 1625 may channel decode a bit stream to acquire a bit stream for one codeword.

Components and operations of the receiving device 300 in FIG. 21 may be similar to or the same as those in FIGS. 16 and 17 illustrated for describing FIG. 20, except for the above-described channel encoder 121 in FIG. 17, therefore, detailed description therefor will be omitted.

Figure 22:
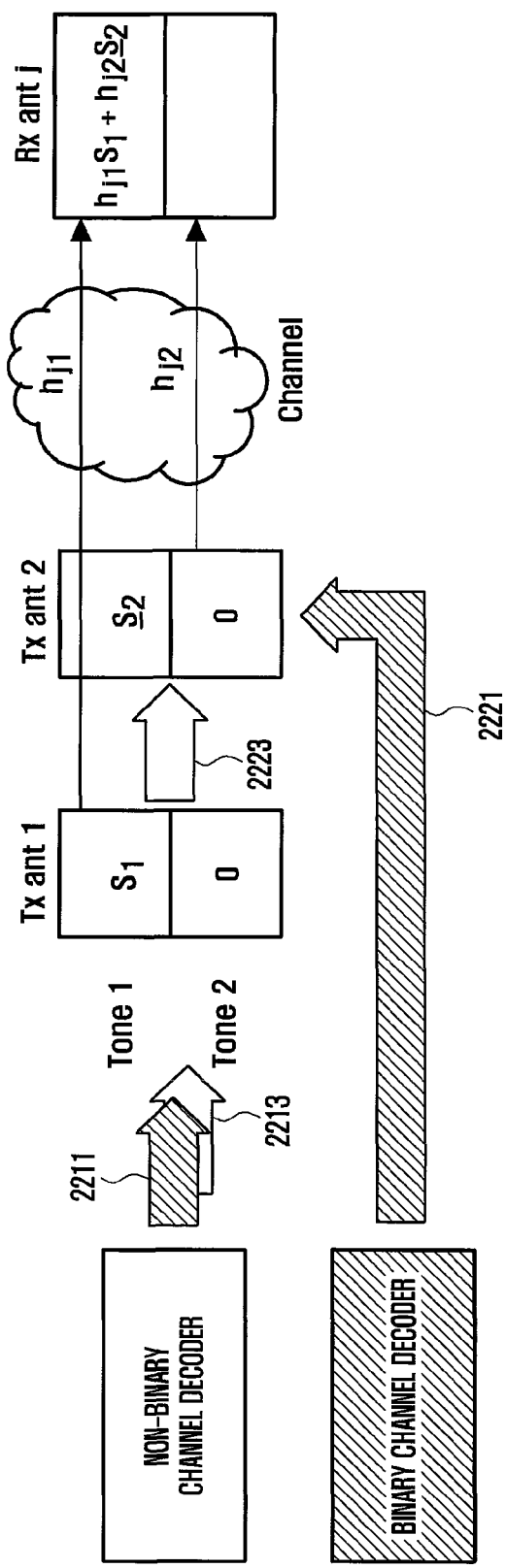
FIG. 22 is still another exemplified diagram for describing a concept in which a symbol is mapped to a frequency tone according to an embodiment of the present invention.

FIG. 22 is still another exemplified diagram for describing a concept in which a symbol is mapped to a frequency tone according to an embodiment of the present invention.

For example, the transmitting device 200 may channel encode a first bit stream for a first codeword using a non-binary channel code, and channel encode a second bit stream for a second codeword using a binary channel code. The transmitting device 200 may modulate a first symbol (e.g. $S_1$) by the 2F4QAM mode from the channel-encoded first bit stream, and modulate a second symbol (e.g. $S_2$) by the 4-QAM mode from the channel-encoded second bit stream.

A QAM signal 2211 of a first symbol may be mapped 2213 to a frequency tone according to an FSK signal of the first symbol. The transmitting device 200 may perform a control so that a signal of a second symbol is mapped 2223 to an activation tone that is the frequency tone to which the signal of the first symbol is mapped. The signal of the second symbol may be a QAM signal 2221 of the second symbol. In this case, since one frequency tone among frequency tones belonging to the FQAM resource element may be used in the system, interference in corresponding frequency band may have the non-Gaussian characteristic, or the non-Gaussian characteristic may be improved.

The transmitting device 200 may transmit the QAM signal of the first symbol through a first antenna, and transmit the QAM signal of the second symbol through a second antenna. A level number of the FQAM modulated symbol may be FQ that is a product of the level number F of the FSK signal of the symbol and the level number Q of the QAM signal of the symbol. When the FQAM first symbol of the FQ level and the QAM second symbol of the Q level are transmitted together, a level number of transmitted signal may be $FQ^2$.

Further, when N different symbols including the first symbol corresponding to the FQAM mode and N−1 symbols corresponding to the QAM mode that include the second symbol are transmitted together through N antennas including the first antenna and the second antenna, a level number capable of indicating information during time duration during which the N symbols are transmitted once using the preset number of frequency tones may be represented by Equation 1 below. The N antennas may mean actually and physically divided N antennas or N antenna ports logically defined by different precoding vector.

$$M=FQ^N \qquad \text{[Equation 1]}$$

Here, M may represent a level number, F may represent a level number of the FSK signal of the first symbol corresponding to tone location information of a tone to which the signal is mapped among the preset number of frequency tones belonging to the FQAM resource element, and Q may represent a QAM level number that QAM signals of the N symbols identically have in the mapped frequency tone.

The receiving device 300 may receive a signal corresponding to the QAM signal of the first symbol transmitted and went through a channel $H_{f1}$ (e.g. $H_{f1}*S_1$), and a signal corresponding to the QAM signal of the second symbol transmitted and went through a channel $H_{f2}$ (e.g. $H_{f2}*S_2$).

Figure 11:
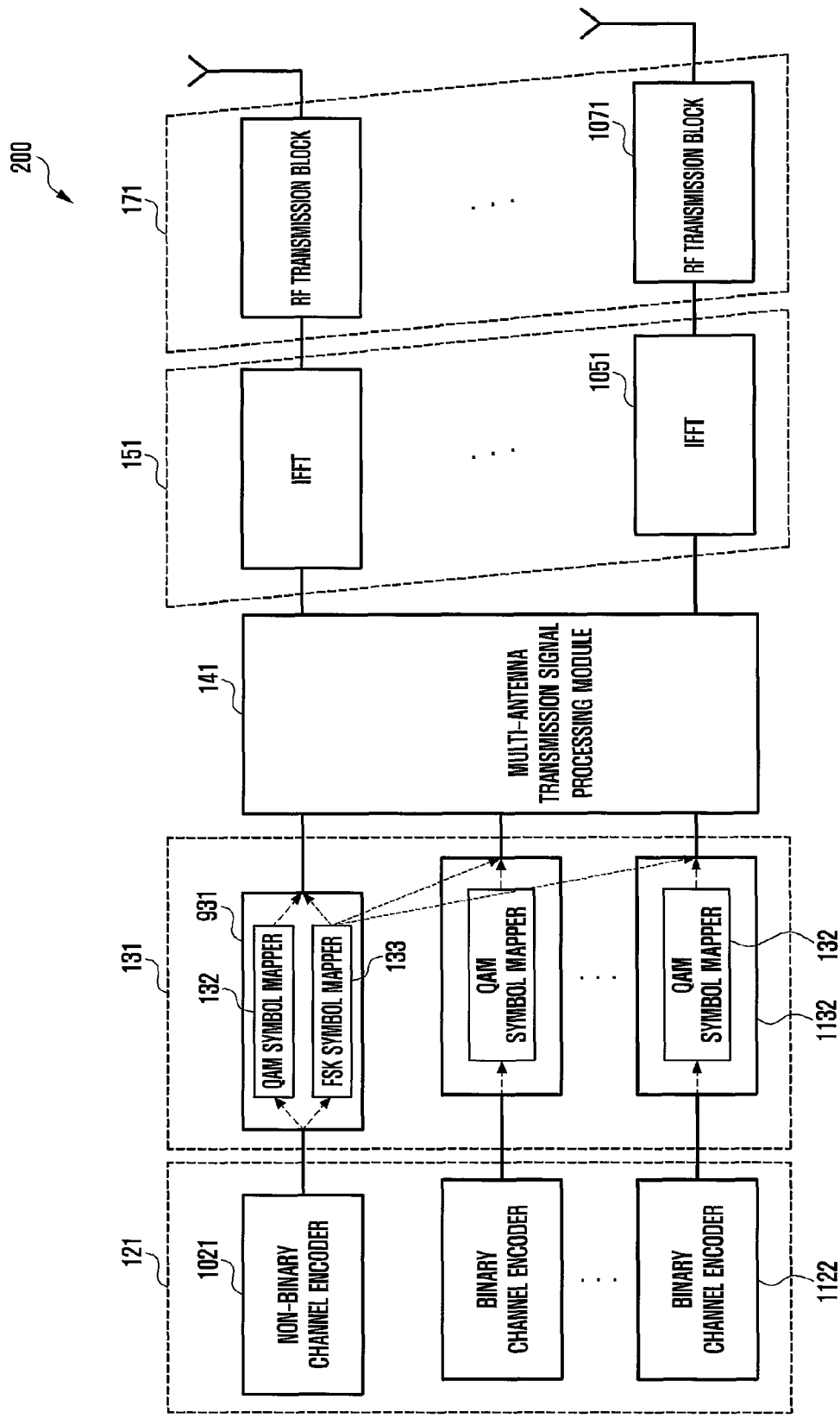
FIG. 11 is another exemplified diagram illustrating a transmitting device in more detail according to an embodiment of the present invention.

For example, referring to FIG. 11, the transmitting device 200 may include a channel encoder 121, a modulation module 131, a multi-antenna transmission signal processing module 141, a multiplexer 151, and an RF transmission module 171.

The channel encoder 121 may include a non-binary channel encoder 1021 performing channel encoding on the first bit stream for the first codeword by using the non-binary channel code. The channel encoder 121 may include a non-binary channel encoder 1122 performing channel encoding on the second bit stream for the second codeword by using the binary channel code. The channel encoder 121 may also include a plurality of binary channel encoders depending on the number of codewords.

The modulation module 131 may include an FQAM modulator 931 and a QAM modulator 1132. Further, the modulation module 131 may include a plurality of QAM modulators corresponding to the number of binary channel encoders. The QAM demodulator 1132 may include a QAM symbol mapper 132 mapping a bit stream to the QAM constellation to generate a modulated signal.

The FQAM modulator 931 may include a QAM symbol mapper 132 and an FSK symbol mapper 133. The FSK symbol mapper 133 may map a bit stream to the constellation of the FSK signal to acquire a modulated signal or symbol.

Further the FSK symbol mapper 133 may designate an activation tone (or basic resource element) carrying QAM signals output from a plurality of QAM symbol mappers belonging to the FQAM modulator 931 or the modulation module 131 in the FQAM resource element (or resource block) according to the FSK signal of the FQAM symbol from the bit stream. As an example, the FQAM modulator 931 may designate one activation tone among the plurality of frequency tones belonging to the FQAM resource element.

Figure 14:
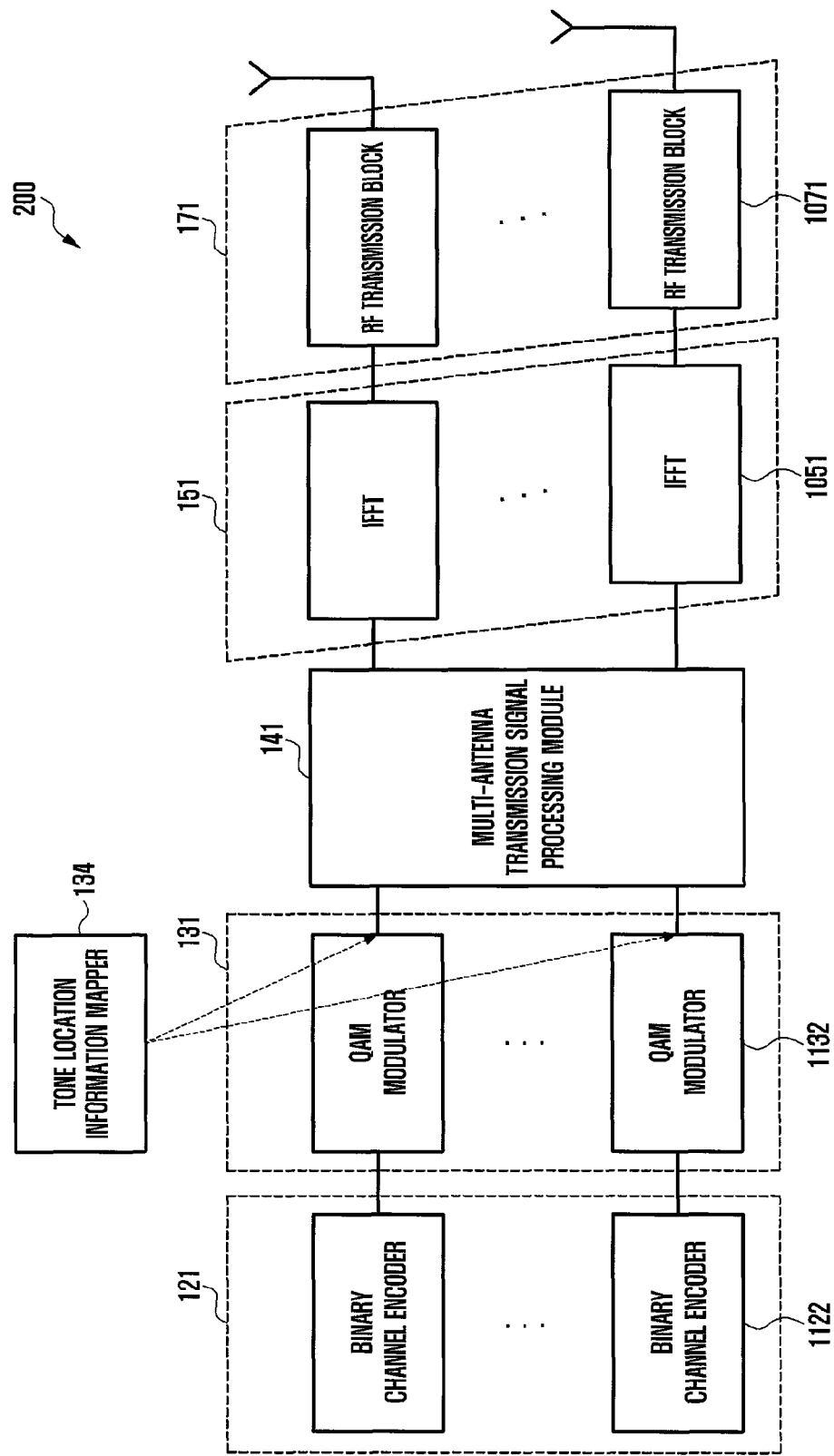
FIG. 14 is still another exemplified diagram illustrating a transmitting device in more detail according to an embodiment of the present invention.

Further, referring to FIGS. 11 and 14, the transmitting device 200 according to another embodiment may include a channel encoder 121 including a non-binary channel encoder 1021 and a binary channel encoder 1122 in FIG. 11 and a modulation module 131 including a plurality of QAM modulators and a tone location information mapper 134 in FIG. 14.

A bit stream of the non-binary channel encoder 1021 may be distributed to be transmitted to the tone location information mapper 134 and the QAM modulator 1132. The tone location information mapper 134 may perform the same function as the FSK symbol mapper in FIG. 11. The tone location information mapper 134 may designate an activation tone among a plurality of frequency tones belonging to the FQAM resource element (or resource block) according to tone location information indicated by the bit stream. The transmitting device 200 may use the activation tone designated according to the tone location information to transmit QAM signals of a plurality of symbols corresponding to the QAM mode together through different antennas.

Figure 18:
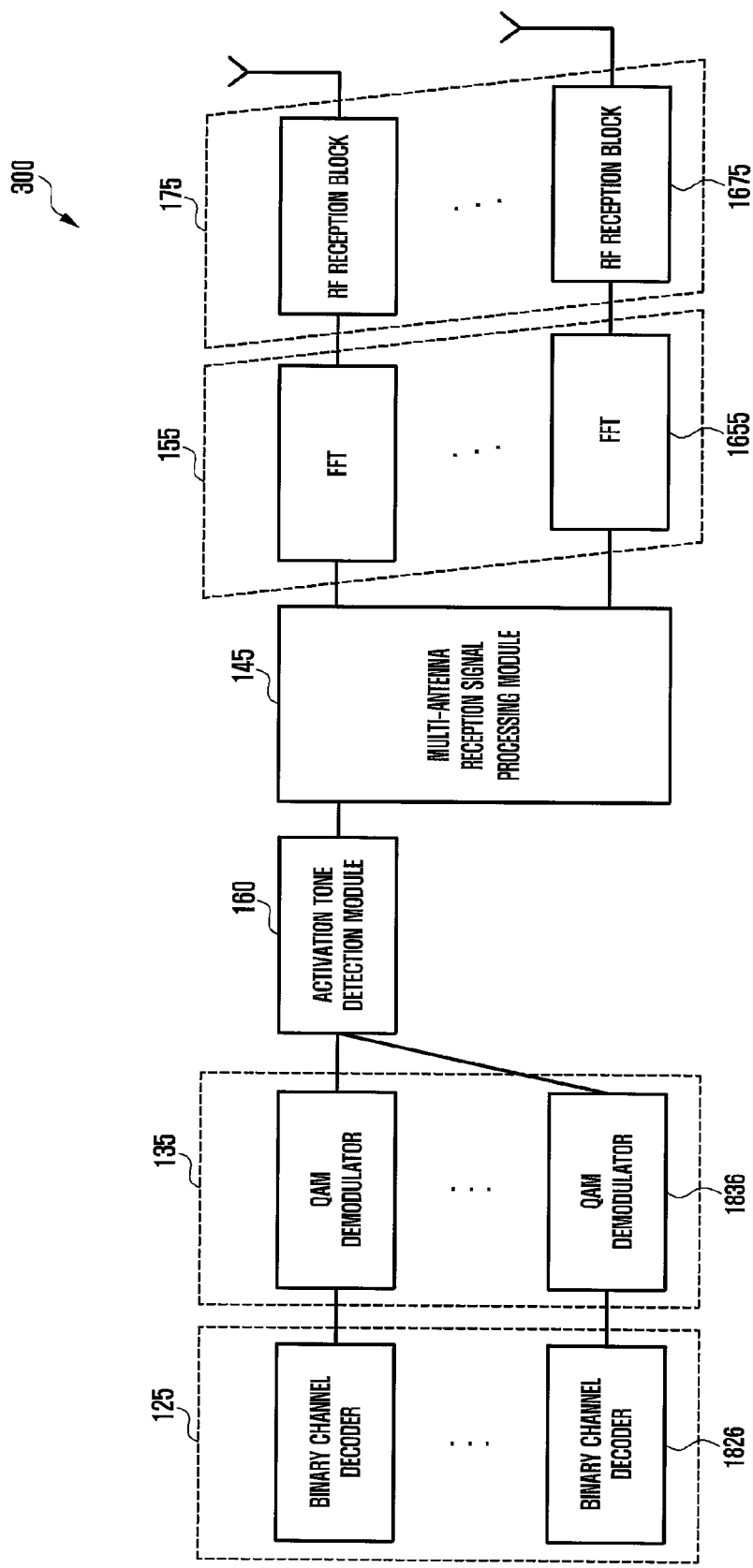
FIG. 18 is still another exemplified diagram illustrating a receiving device in more detail according to an embodiment of the present invention.

For example, referring to FIGS. 16 and 18, the receiving device 300 may include a channel decoder 125, a demodulation module 135, a multi-antenna reception signal processing module 145, a demultiplexer 155, and an RF reception module 175. When the transmitting device 200 corresponding to the receiving device 300 transmits a signal by the multi-user MIMO scheme, the receiving device 300 may receive one or the preset number of codewords. For example, in FIG. 16, the receiving device 300 may receive an FQAM-modulated first symbol. In FIG. 18, the receiving device 300 may receive a QAM-modulated second symbol.

In FIG. 18, the receiving device 300 may further include an activation tone detection module 160. The activation tone detection module 160 may detect tone location information on one activation tone among the preset number of frequency tones belonging to the FQAM resource element from the received signal. The demodulation module 135 may include a QAM demodulator 1836. The QAM demodulator 1836 may demodulate a QAM signal carried by the activation tone according to the tone location information received from the activation tone detection module 160.

Figure 19:
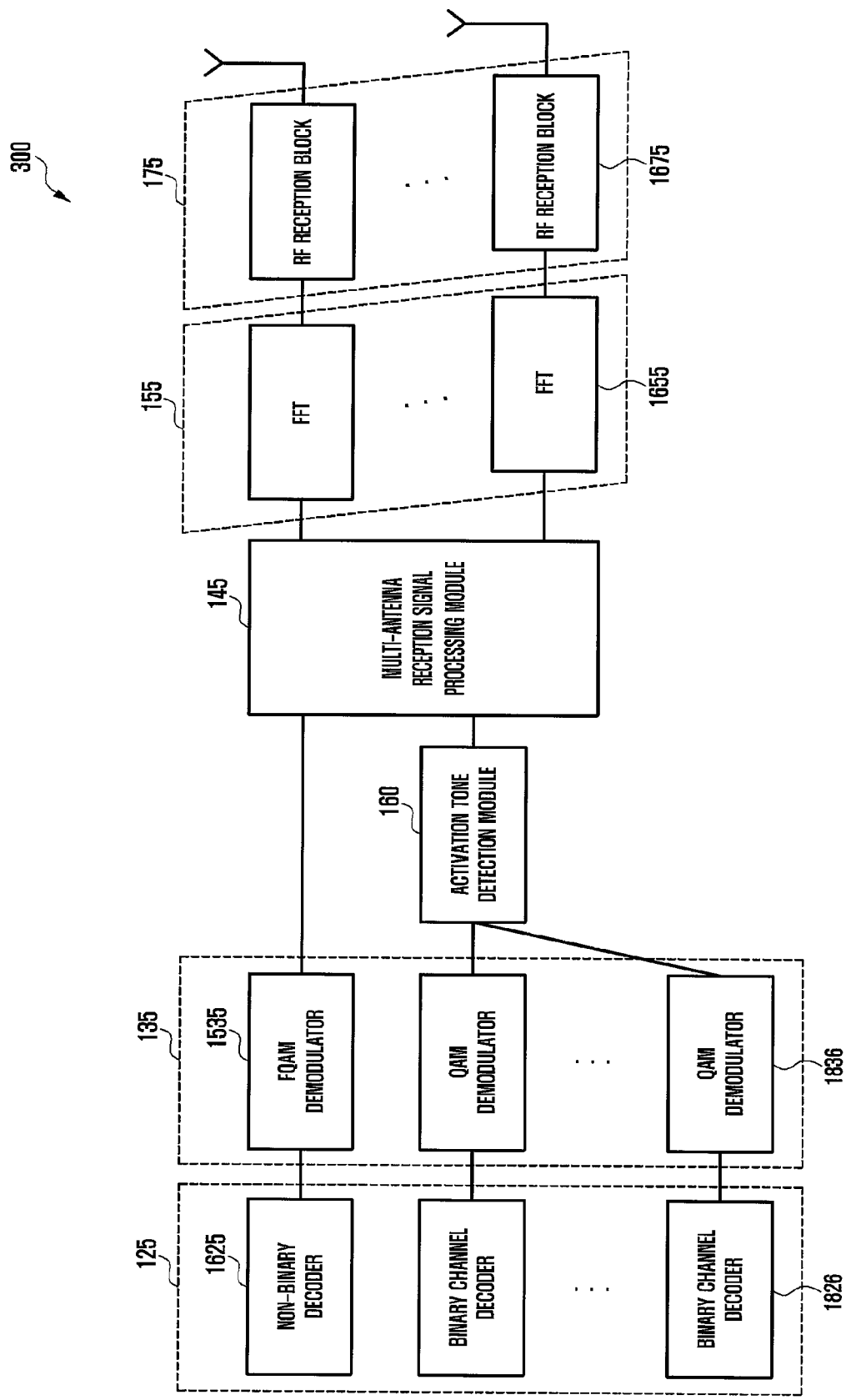
FIG. 19 is still another exemplified diagram illustrating a receiving device in more detail according to an embodiment of the present invention.

Further, referring to FIG. 19, the receiving device 300 according to another embodiment may receive the FQAM-modulated first symbol and the QAM-modulated second symbol described in FIGS. 16 and 18 together. As an example, when the transmitting device 200 corresponding to the receiving device 300 transmits a signal for a plurality of codewords together by the single user MIMO scheme, the receiving device 300 may receive the plurality of codewords.

The receiving device 300 may include a channel decoder 125, a demodulation module 135, an activation tone detection module 160, a multi-antenna reception signal processing module 145, a demultiplexer 155, and an RF reception module 175. The channel decoder 125 may include a non-binary channel decoder 1625 and a binary channel decoder 1826. The demodulation module 1535 may include an FQAM demodulator 135 and a QAM demodulator 1836. For example, the FQAM-modulated first symbol may be demodulated in the FQAM demodulator 1535, and the QAM-modulated second symbol that is carried by the activation tone detected through the activation tone detection module 160 may be demodulated in the QAM demodulator 1836.

Figure 23:
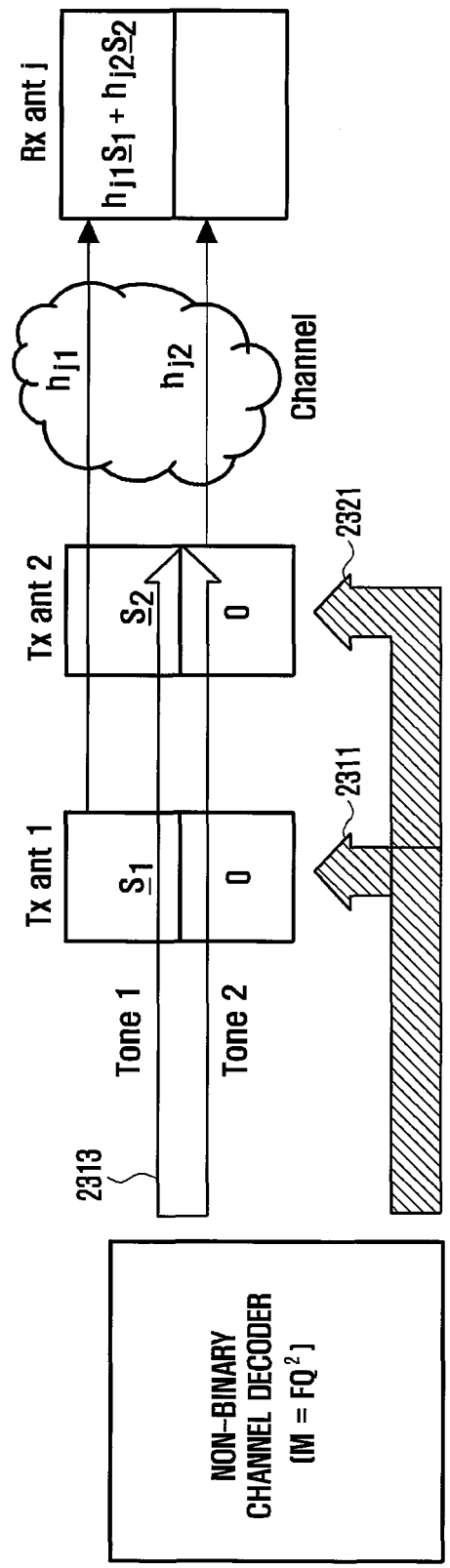
FIG. 23 is still another exemplified diagram for describing a concept in which a symbol is mapped to a frequency tone according to an embodiment of the present invention.

FIG. 23 is still another exemplified diagram for describing a concept in which a symbol is mapped to a frequency tone according to an embodiment of the present invention.

For example, the transmitting device 200 may channel encode a bit stream for one codeword using the non-binary channel code. The transmitting device 200 may distribute the channel-encoded bit stream as tone location information, a first bit stream, and a second bit stream. The transmitting device 200 may modulate a first symbol (e.g. $S_1$) by the 4-QAM mode from the first bit stream, and modulate a second symbol (e.g. $S_2$) by the 4-QAM mode from the second bit stream. The transmitting device 200 may map 2313 a QAM signal 2311 of a first symbol and a QAM signal 2321 of a second symbol to one frequency tone among a plurality of frequency tones belonging to the FQAM resource element according to tone location information. In this case, since one frequency tone among the frequency tones belonging to the FQAM resource element may be used in the system, interference in corresponding frequency band may have the non-Gaussian characteristic, or the non-Gaussian characteristic may be improved.

The transmitting device 200 may transmit the modulated signal of the first symbol through a first antenna, and transmit the modulated signal of the second symbol through a second antenna. A level number of the tone location information may be F that is the number of frequency tones (basic resource elements) of the FQAM resource element. When the QAM first symbol of the Q level and the QAM second symbol of the Q level are transmitted together, a level number of transmitted signal including the tone location information may be $FQ^2$.

The receiving device 300 may receive a signal corresponding to the QAM signal of the first symbol transmitted and went through a channel $H_{f1}$ (e.g. $H_{f1}*S_1$), and a signal corresponding to the QAM signal of the second symbol transmitted and went through a channel $H_{f2}$ (e.g. $H_{f2}*S_2$).

Figure 12:
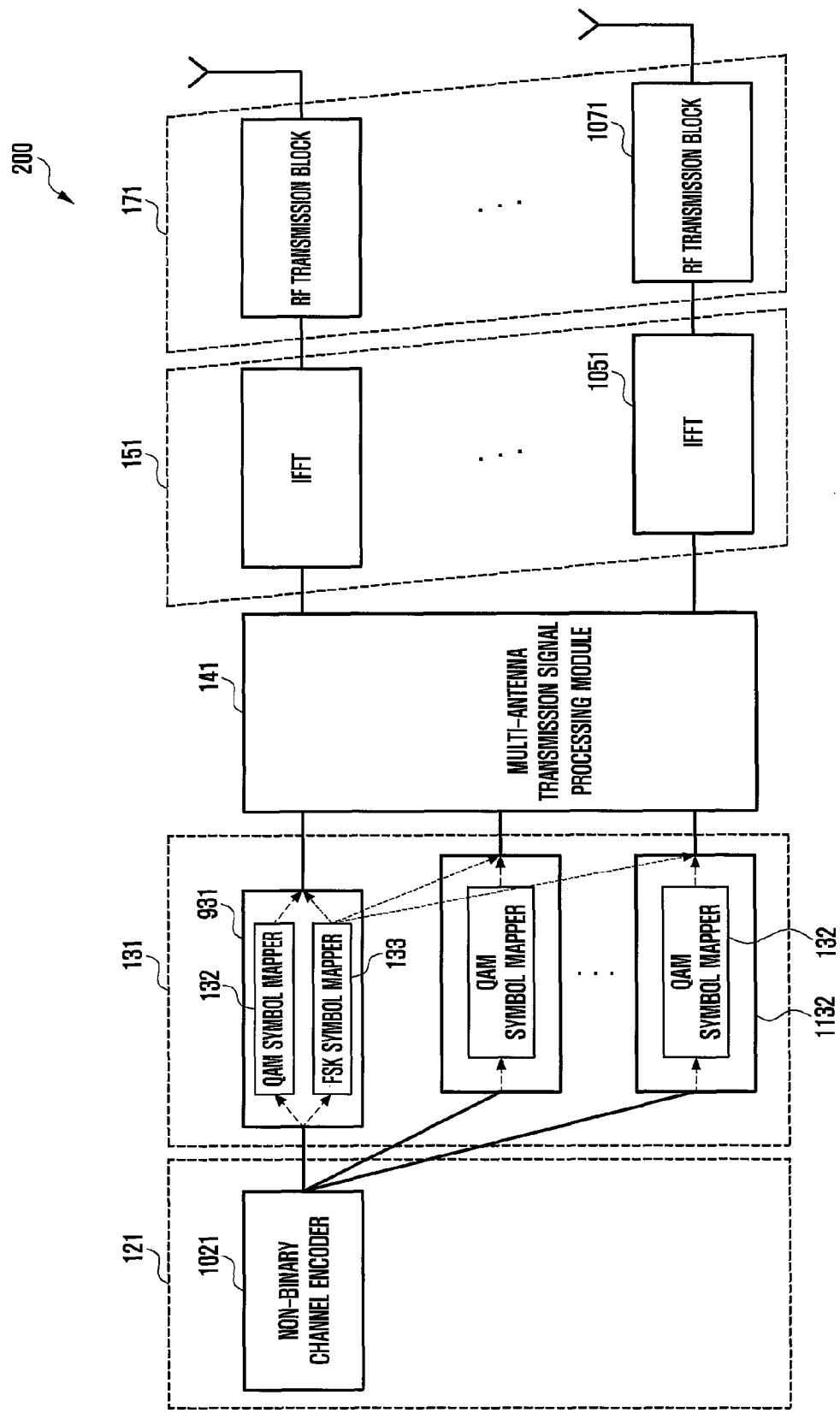
FIG. 12 is still another exemplified diagram illustrating a transmitting device in more detail according to an embodiment of the present invention.
Figure 13:
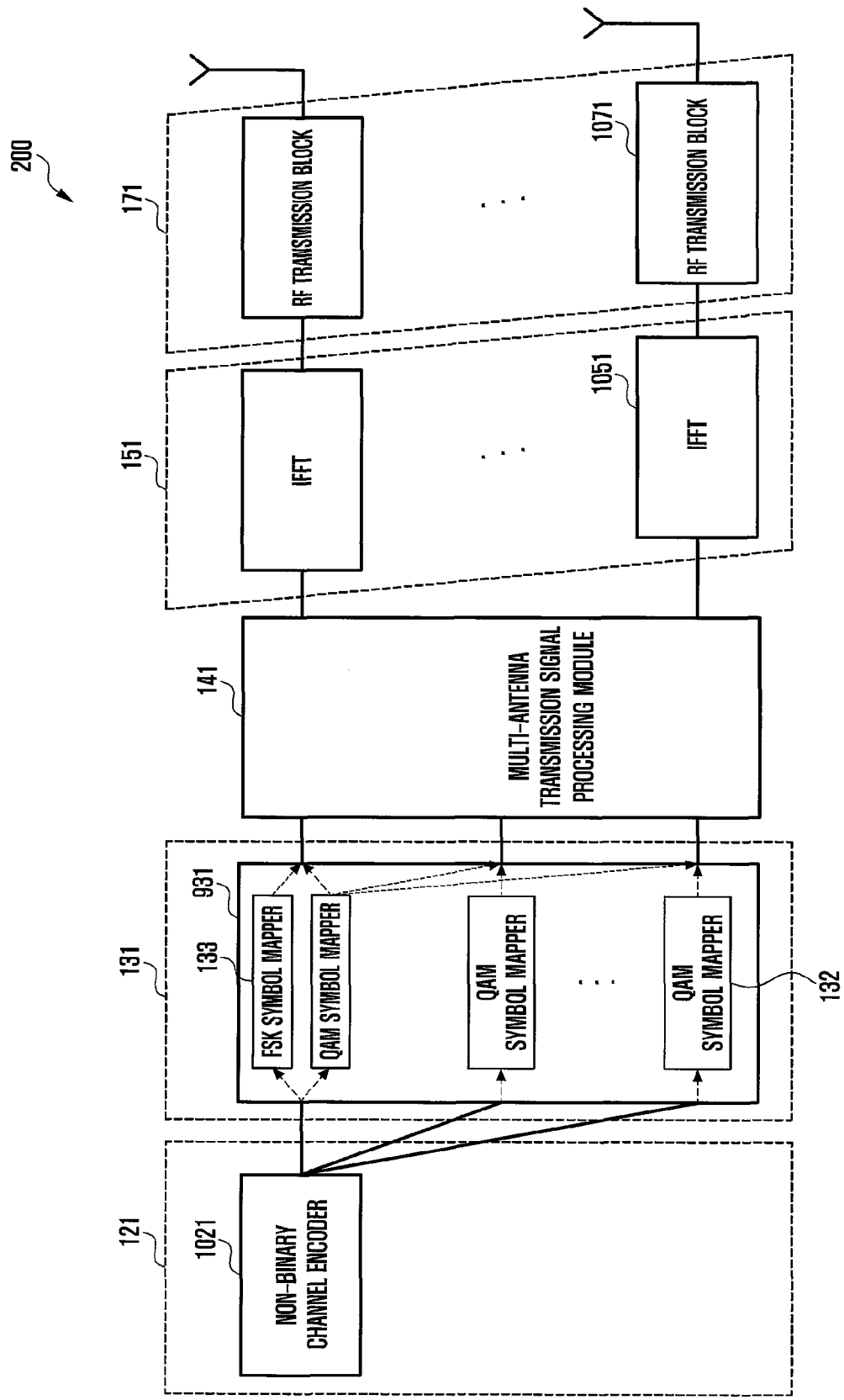
FIG. 13 is still another exemplified diagram illustrating a transmitting device in more detail according to an embodiment of the present invention.

For example, referring to FIGS. 12 and 13, the transmitting device 200 may include a channel encoder 121, a modulation module 131, a multi-antenna transmission signal processing module 141, a multiplexer 151, and an RF transmission module 171.

In FIG. 12, the channel encoder 121 may include a non-binary channel encoder 1021. The modulation module 131 may include an FQAM modulator 931 and a QAM modulator 1132. Further, the modulation module 131 may include a plurality of QAM modulators.

The non-binary channel encoder 1021 may distribute the channel-encoded bit stream to the FQAM modulator 931 and the QAM modulator 1132. Further, the bit stream input to the FQAM modulator 931 may be distributed to a QAM symbol mapper 132 and an FSK symbol mapper 133. A bit stream input to the FSK symbol mapper 133 may be tone location information. The FSK symbol mapper 133 may designate an activation tone carrying QAM signals according to the tone location information.

Further, in FIG. 13, the channel encoder 121 may include a non-binary channel encoder 1021, and the modulation module 131 may include an FQAM modulator 931. The FQAM modulator 931 may include an FSK symbol mapper 133 and a QAM symbol mapper 132. Further, the FQAM modulator 931 may include a plurality of QAM symbol mappers including the QAM symbol mapper 132. The non-binary channel encoder 1021 may distribute the channel-encoded bit stream to the FSK symbol mapper 133 and the plurality of QAM symbol mappers. A bit stream input to the FSK symbol mapper 133 may be tone location information. The FSK symbol mapper 133 may designate an activation tone carrying QAM signals modulated by the QAM symbol mappers according to the tone location information.

Further, referring to FIG. 14, the transmitting device 200 according to another embodiment may include a channel encoder 121, a modulation module 131, a tone location information mapper 134, a multi-antenna transmission signal processing module 141, a multiplexer 151, and an RF transmission module 171. As described in FIGS. 12 and 13, the channel encoder 121 may include one non-binary channel encoder 1021. The modulation module 131 may include a plurality of QAM modulators including the QAM modulator 1132. The non-binary channel encoder 1021 may distribute and transmit the channel-encoded bit stream to the tone location information mapper 134 and the plurality of QAM modulators. A bit stream input to the tone location information mapper 134 may be tone location information. The tone location information mapper 134 may designate one activation tone carrying QAM signals modulated through the plurality of QAM modulators among the plurality of frequency tones belonging to the FQAM resource element.

Further, referring to FIG. 14, the transmitting device 200 according to still another embodiment may include a channel encoder 121, a modulation module 131, a tone location information mapper 134, a multi-antenna transmission signal processing module 141, a multiplexer 151, and an RF transmission module 171. The transmitting device 200 may generate tone location information regardless of codeword or may also designate the tone location information by a preset sequence, or the like. As an example, the tone location information may be used to designate an activation tone in the transmitting device 200. The tone location information may be used to detect the location of the activation tone carrying QAM signals in the receiving device 300, and may not be used as a decoded bit stream for acquiring a codeword. When two QAM signals of the Q level are transmitted through an activation tone at a specific location, a signal level for the codeword except the tone location information may be $Q^2$.

The channel encoder 121 may include at least one binary channel encoder including the binary channel encoder 1122. The modulation module 131 may include a plurality of QAM modulators including the QAM modulator 1132. As an example, the tone location information mapper 134 may designate an activation tone carrying QAM signals modulated by the QAM modulators according to the preset sequence.

For example, referring to FIGS. 16 and 18, the receiving device 300 may include a channel decoder 125, a demodulation module 135, a multi-antenna reception signal processing module 145, a demultiplexer 155, and an RF reception module 175. As an example, when the transmitting device 200 corresponding to the receiving device 300 transmits a signal by the multi-user MIMO scheme, the receiving device 300 may receive one or the preset number of codewords. In FIG. 16, the receiving device 300 may decode a QAM-modulated first symbol (or a QAM signal of a first symbol corresponding to the QAM mode) and tone location information using the FQAM demodulator 1535 to acquire a non-binary channel-encoded bit stream for one codeword. In FIG. 18, the receiving device 300 may further include an activation tone detection module 160. The receiving device 300 may receive a QAM-modulated second symbol (or a QAM signal of a second symbol corresponding to the QAM mode).

Further, referring to FIG. 18, in the receiving device 300 according to another embodiment, the channel decoder 125 in FIG. 18 may include one non-binary channel decoder 1625, and binary channel decoders may be omitted. The receiving device 300 may receive the QAM signal of the first symbol and the QAM signal of the second symbol together. The activation tone detection module 160 may detect tone location information on one activation tone among the preset number of frequency tones belonging to the FQAM resource element from the received signal. The demodulation module 135 may include QAM demodulators. The QAM demodulator 1836 may demodulate a QAM signal carried by the activation tone according to the tone location information received from the activation tone detection module 160. The non-binary channel decoder 1625 may receive the tone location information from the activation tone detection module and acquire a combined bit stream by combining the received tone location information and the demodulated bit stream received from the plurality of QAM demodulators. The non-binary channel decoder 1625 may channel decode the combined bit stream to acquire one codeword.

Further, referring to FIG. 19, in the receiving device 300 according to still another embodiment, the channel decoder 125 as in FIG. 19 may include one non-binary channel decoder 1625, and a binary channel decoder 1826 may be omitted. The QAM signal of the first symbol and the tone location information may be demodulated through the FQAM demodulator 1535 and the QAM signal of the second symbol may be demodulated by the QAM demodulator 1836. The non-binary channel decoder 1625 may combine the bit stream for the QAM signal of the first symbol, the bit stream for the QAM signal of the second symbol, and the tone location information. The non-binary channel decoder 1625 may channel decode the combined bit stream to acquire one codeword.

Figure 24:
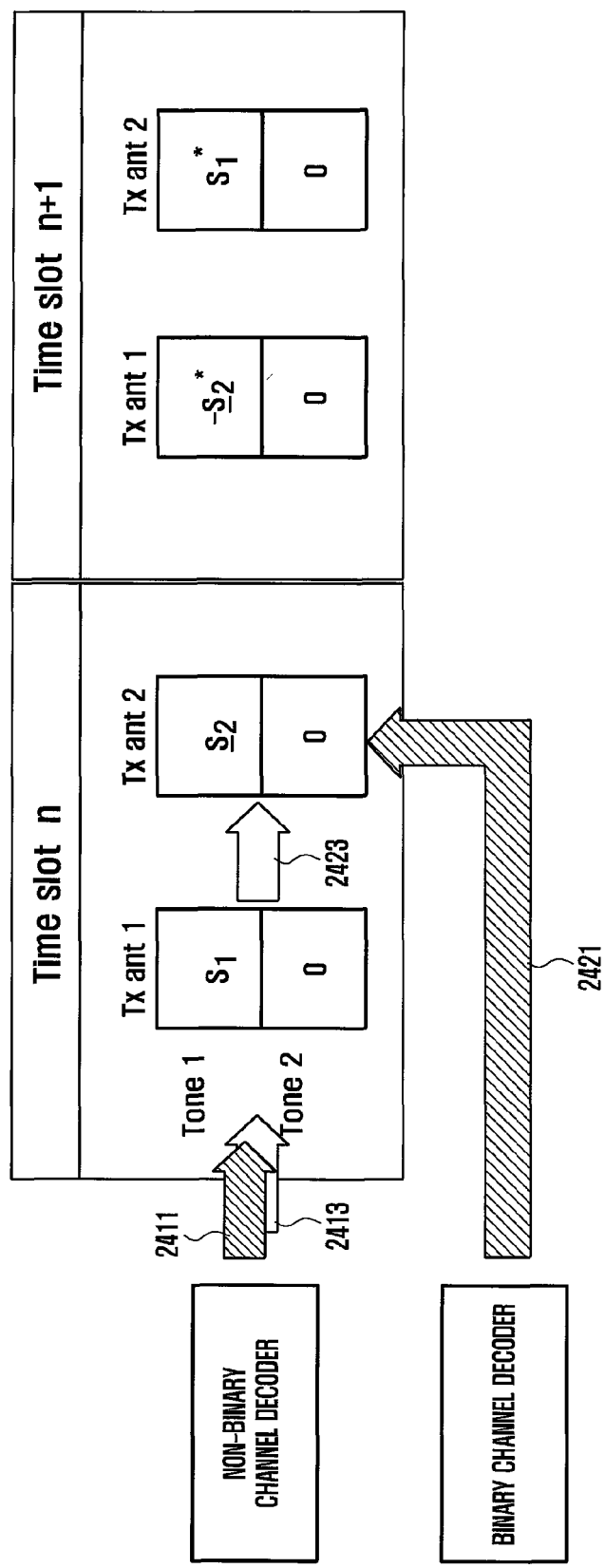
FIG. 24 is still another exemplified diagram for describing a concept in which a symbol is mapped to a frequency tone according to an embodiment of the present invention.

FIG. 24 is still another exemplified diagram for describing a concept in which a symbol is mapped to a frequency tone according to an embodiment of the present invention.

For example, the transmitting device 200 may perform space-time coding on the first symbol and the second symbol and transmit the space-time coded first and second symbols through the FQAM resource element during time duration of two slots.

The transmitting device 200 may channel encode a first bit stream for a first codeword using a non-binary channel code and channel encode a second bit stream for a second codeword using a binary channel code.

In order to generate a signal transmitted to an N-th slot, the transmitting device 200, for example, may modulate the first symbol (e.g. $S_1$) by the 2F4QAM mode from the channel-encoded first bit stream and modulate the second symbol (e.g. $S_2$) by the 4-QAM mode from the channel-encoded second bit stream.

A QAM signal 2411 of the first symbol may be mapped 2213 to one frequency tone among the FQAM resource elements according to an FSK signal of the first symbol. The transmitting device 200 may perform a control so that a QAM signal 2421 of the second symbol is mapped 2423 to an activation tone that is the frequency tone to which the signal of the first symbol is mapped.

The transmitting device 200 may transmit the QAM signal of the first symbol corresponding to the FQAM mode through a first antenna and transmit the QAM signal of the second symbol corresponding to the QAM mode through a second antenna, at the N-th slot.

In order to generate a signal transmitted to an N+1-th slot, the transmitting device 200, for example, may perform space-time coding on the first symbol $S_1$ to be $S_1^*$ and on the second symbol $S_2$ to be $S_2^*$ using Alamouti code.

Further, the transmitting device 200 may perform a control so that the QAM signal of the space-time coded first symbol (e.g. $S_1^*$) and the QAM signal of the space-time coded second symbol (e.g. $S_2^*$) are mapped to the same activation tone as the frequency tone designated in the N-th slot among the preset number of frequency tones belonging to the FQAM resource element to be used in the N+1-th slot.

The transmitting device 200 may transmit the QAM signal of the space-time coded second symbol (e.g. $S_2^*$) through a first antenna and transmit the QAM signal of the space-time coded first symbol (e.g. through a second antenna, at the N+1-th slot.

When a level number of an FSK signal of the first symbol corresponding to the FQAM mode is F, and a level number of the QAM signal of the first symbol and the second symbol is Q, a level number of a signal transmitted during time duration of two slots may be $FQ^2$.

The receiving device 300 may decode a space-time coded signal using the multi-antenna reception signal processing module 141.

Figure 25:
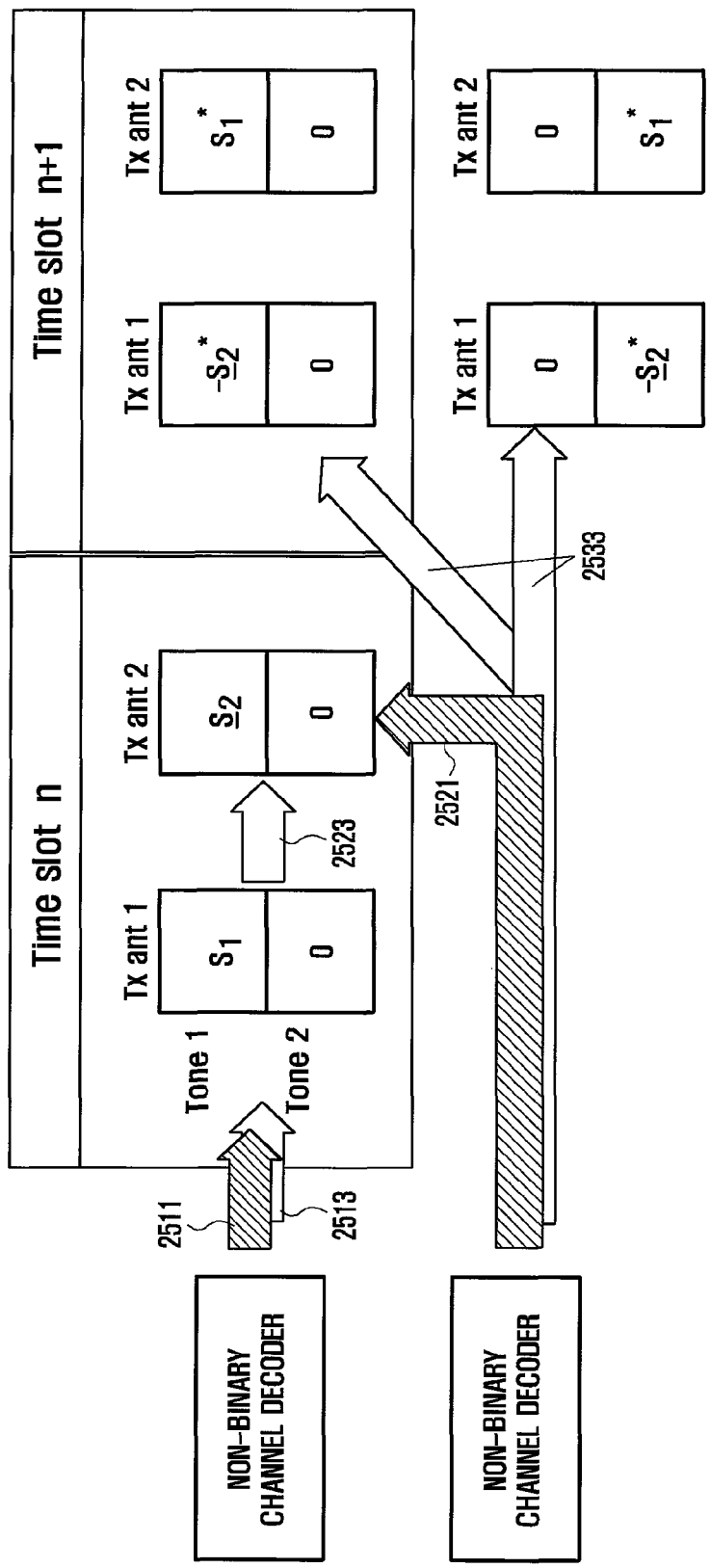
FIG. 25 is still another exemplified diagram for describing a concept in which a symbol is mapped to a frequency tone according to an embodiment of the present invention.

FIG. 25 is still another exemplified diagram for describing a concept in which a symbol is mapped to a frequency tone according to an embodiment of the present invention.

For example, the transmitting device 200 may perform space-time coding on the first symbol and the second symbol and transmit the space-time coded first and second symbols through the FQAM resource element during time duration of two slots.

The transmitting device 200 may channel encode a first bit stream for a first codeword using a non-binary channel code and channel encode a second bit stream for a second codeword using the non-binary channel code.

In order to generate a signal transmitted to an N-th slot, the transmitting device 200, for example, may modulate the first symbol (e.g. $S_1$) by the 2F4QAM mode from the channel-encoded first bit stream and modulate the second symbol (e.g. $S_2$) by the 2F4QAM mode from the channel-encoded second bit stream.

A QAM signal 2511 of the first symbol may be mapped 2513 to one frequency tone among the FQAM resource elements according to an FSK signal of the first symbol. The transmitting device 200 may perform a control so that a QAM signal 2521 of the second symbol is mapped 2523 to a first activation tone to which the QAM signal of the first symbol is mapped.

The transmitting device 200 may transmit the QAM signal of the first symbol through a first antenna and transmit the QAM signal of the second symbol through a second antenna using the first activation tone mapped according to the FSK signal of the first symbol, at the N-th slot.

In order to generate a signal transmitted to an N+1-th slot, the transmitting device 200, for example, may perform space-time coding on the first symbol $S_1$ to be $S_1^*$ and on the second symbol $S_2$ to be $S_2^*$.

The transmitting device 200 may perform a control so that the QAM signal of the space-time coded second symbol (e.g. $S_2^*$) is mapped 2533 to one frequency tone among the FQAM resource elements of the N+1-th slot according to an FSK signal of the second symbol. Further, the transmitting device 200 may perform a control so that the QAM signal of the space-time coded first symbol is mapped 2533 to a second activation tone to which the QAM signal of the space-time coded second symbol is mapped.

The transmitting device 200 may transmit the QAM signal of the space-time coded second symbol through the first antenna and the QAM signal of the space-time coded first symbol through the second antenna using the second activation tone mapped according to the FSK signal of the second symbol, at the N+1-th slot.

When a level number of the FSK signal of the first symbol and the second symbol corresponding to the FQAM mode is F, and a level number of the QAM signal of the first symbol and the second symbol is Q, a level number of a signal transmitted during time duration of two slots may be $F^2Q^2$.

Figure 26:
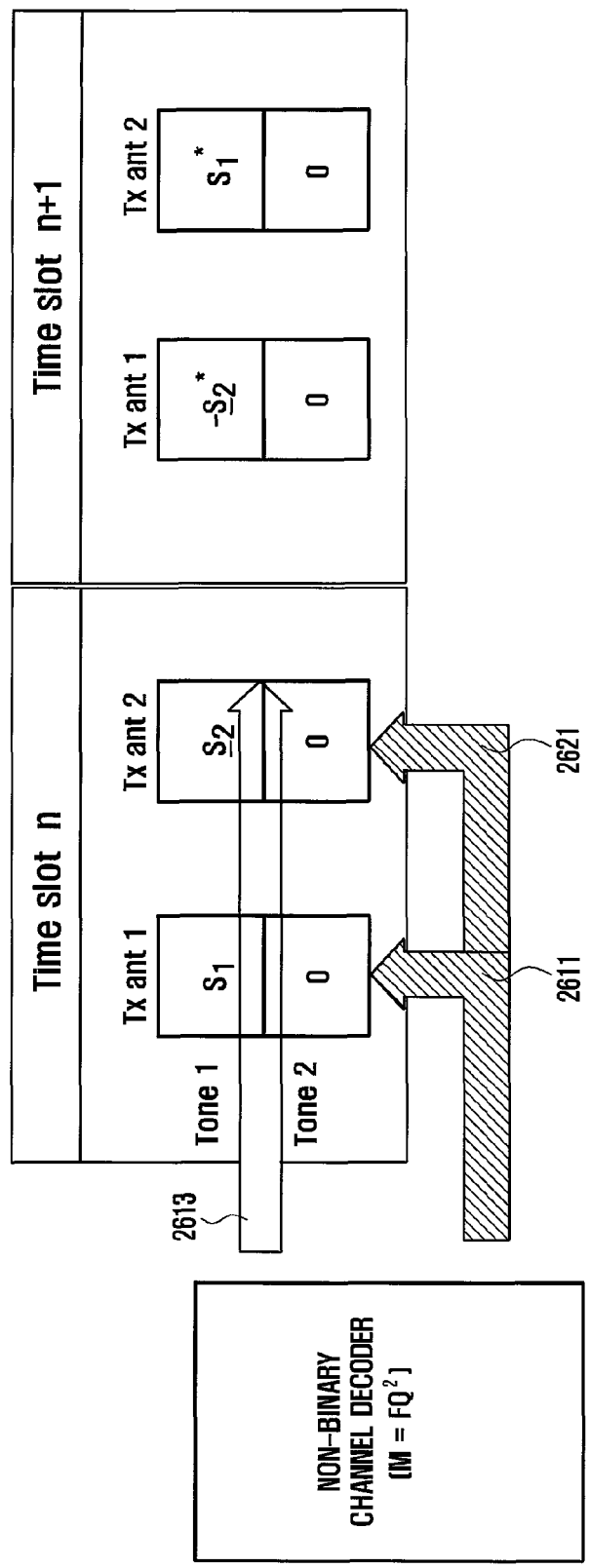
FIG. 26 is still another exemplified diagram for describing a concept in which a symbol is mapped to a frequency tone according to an embodiment of the present invention.

FIG. 26 is still another exemplified diagram for describing a concept in which a symbol is mapped to a frequency tone according to an embodiment of the present invention.

For example, the transmitting device 200 may perform space-time coding on the first symbol and the second symbol and transmit the space-time coded first and second symbols through the FQAM resource element during time duration of two slots.

The transmitting device 200 may channel encode a bit stream for one codeword using the non-binary channel code. The transmitting device 200 may distribute the channel-encoded bit stream as tone location information, a first bit stream, and a second bit stream.

In order to generate a signal transmitted to an N-th slot, the transmitting device 200 may modulate a first symbol (e.g. $S_1$) by the QAM mode from the first bit stream and modulate a second symbol (e.g. $S_2$) by the QAM mode from the second bit stream.

The transmitting device 200 may perform a control so that a QAM signal 2611 of the first symbol and a QAM signal 2621 of the second symbol are mapped 2613 to one frequency tone among the preset number of frequency tones belonging to the FQAM resource element according to tone location information.

The transmitting device 200 may transmit the QAM signal of the first symbol through a first antenna, and transmit the QAM signal of the second symbol through a second antenna, at the N-th slot.

In order to generate a signal transmitted to an N+1-th slot, the transmitting device 200, for example, may perform space-time coding on the first symbol $S_1$ to be $S_1^*$ and on the second symbol $S_2$ to be $S_2^*$.

Further, the transmitting device 200 may perform a control so that the space-time coded first symbol (e.g. $S_1^*$) and the space-time coded second symbol (e.g. $S_2^*$) are mapped to the same activation tone as the frequency tone designated in the N-th slot in the FQAM resource element to be used in the N+1-th slot.

The transmitting device 200 may transmit the QAM signal of the space-time coded second symbol (e.g. $S_2^*$)

through the first antenna and the QAM signal of the space-time coded first symbol (e.g. $S_1^*$) through the second antenna, at the N+1-th slot.

When the number of basic resource elements belonging to the FQAM resource element or a level number of the tone location information is F, and a level number of the QAM signal of the first symbol and the second symbol is Q, a level number of a signal transmitted during time duration of two slots may be $FQ^2$.

Figure 27:
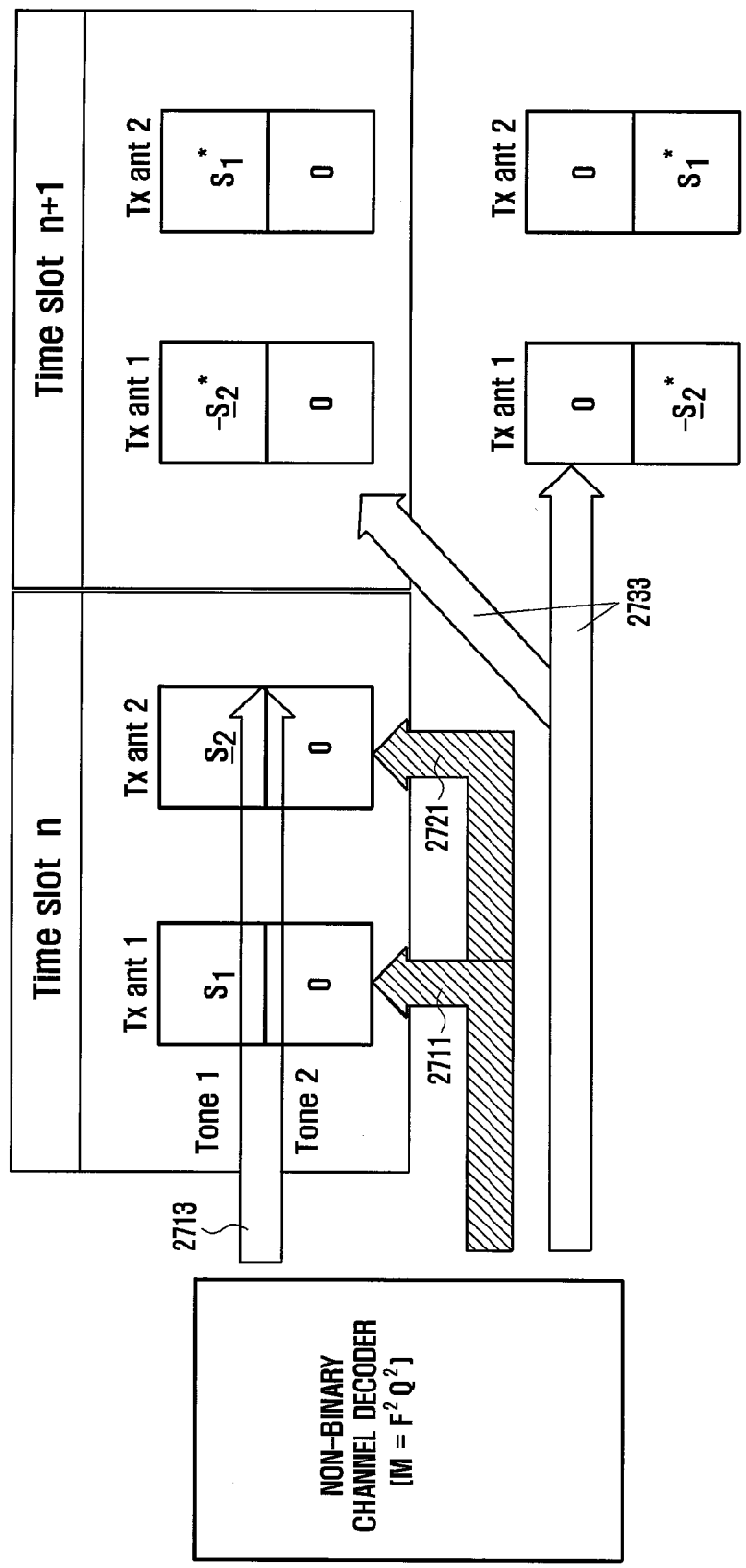
FIG. 27 is still another exemplified diagram for describing a concept in which a symbol is mapped to a frequency tone according to an embodiment of the present invention.

FIG. 27 is still another exemplified diagram for describing a concept in which a symbol is mapped to a frequency tone according to an embodiment of the present invention.

For example, the transmitting device 200 may perform space-time coding on the first symbol and the second symbol and transmit the space-time coded first and second symbols through the FQAM resource element during time duration of two slots.

The transmitting device 200 may channel encode a bit stream for one codeword using the non-binary channel code. The transmitting device 200 may distribute the channel-encoded bit stream as tone location information, a first bit stream, and a second bit stream. The tone location information may include first tone location information used in an N-th slot and second tone location information used in an N+1-th slot.

In order to generate a signal transmitted to the N-th slot, the transmitting device 200 may modulate the first symbol (e.g. $S_1$) by the QAM mode from the first bit stream and modulate the second symbol (e.g. $S_2$) by the QAM mode from the second bit stream.

The transmitting device 200 may perform a control so that a QAM signal 2711 of the first symbol and a QAM signal 2721 of the second symbol are mapped 2713 to one frequency tone (or first activation tone) among the preset number of frequency tones belonging to the FQAM resource element according to the first tone location information.

The transmitting device 200 may transmit the QAM signal of the first symbol through a first antenna, and transmit the QAM signal of the second symbol through a second antenna, using the first activation tone at the N-th slot.

In order to generate a signal transmitted to the N+1-th slot, the transmitting device 200, for example, may perform space-time coding on the first symbol $S_1$ to be $S_1^*$ and on the second symbol $S_2$ to be $S_2^*$.

The transmitting device 200 may perform a control so that the QAM signal of the space-time coded second symbol (e.g. $S_2^*$) is mapped 2733 to one frequency tone among the FQAM resource elements of the N+1-th slot according to the second tone location information. Further, the transmitting device 200 may perform a control so that the QAM signal of the space-time coded first symbol is mapped 2733 to a second activation tone to which the space-time coded second symbol is mapped.

The transmitting device 200 may transmit the QAM signal of the space-time coded second symbol through the first antenna, and the QAM signal of the space-time coded first symbol through the second antenna, using the second activation tone at the N+1-th slot.

When a level number of the first tone location information and the second tone location information is F, and a level number of the QAM signal of the first symbol and the second symbol is Q, a level number of a signal transmitted during time duration of two slots may be $F^2Q^2$.

It should be noted that in the transmitting device 200 or the receiving device 300 illustrated in FIGS. 10 to 14, 16 to 19, or 20 to 27, the level number of the FSK, QAM or FQAM mode or the level number of the signal transmitted during preset time duration is not limited to the illustrated level number, but may be various.

Further, it should be noted that the channel encoder of the transmitting device 200 or the channel decoder of the receiving device 300 illustrated in FIGS. 10 to 14, 16 to 19, or 20 to 27 is not limited to the illustrated binary channel code or non-binary channel code, but at least one of the binary channel code and the non-binary channel code may be selectively used or the binary channel code and the non-binary channel code may be used while being variously combined.

Further, it should be noted that, according to various embodiments, at least some of components included in the transmitting device 200 or the receiving device 300 illustrated in FIGS. 10 to 14, 16 to 19, or 20 to 27 may be omitted, changed, or replaced with other components, or other components may be added.

Further, in the channel encoder 121, the channel decoder 125, the modulation module 131, the demodulation module 135, the multiplexer 151, the demultiplexer 155, the RF transmission module 171, or the RF reception module 175 belonging to the transmitting device 200 or the receiving device 300 illustrated in FIGS. 10 to 14 or 16 to 19, the plurality of components illustrated as being included in each module may be at least one hardware block, at least one software block, or at least one block configured by a combination of the hardware and the software. For example, the plurality of modulators included in the modulation module 131 or the plurality of demodulators included in the demodulation module 135 may be functional components that are logically divided for signal modulation or demodulation processing. The modulation module 131 and the demodulation module 135 may also be implemented as a single block that it is operated according to the driving or function control of the software in one hardware block.

Figure 28:
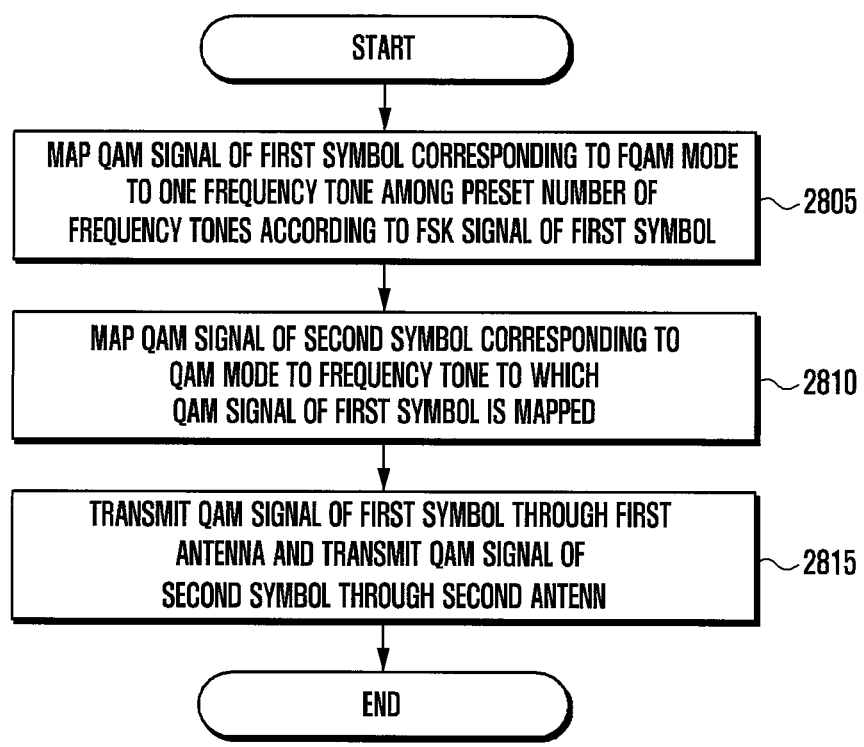
FIG. 28 is a flowchart illustrating a method for transmitting a signal on the basis of multiple antennas according to an embodiment of the present invention.

FIG. 28 is a flowchart illustrating a method for transmitting a signal on the basis of multiple antennas according to an embodiment of the present invention. For example, an operation for transmitting a signal on the basis of multiple antennas may be performed in the transmitting device 200 described above.

In step 2805, the transmitting device 200 may map a QAM signal of a first symbol corresponding to the FQAM mode to one frequency tone among the preset number of frequency tones according to an FSK signal of the first symbol.

Here, the preset number may correspond to a level number representing tone location information. Further, the preset number may correspond to a level number of the FSK signal of the first symbol corresponding to the FQAM mode. The preset number of frequency tones may be basic resource elements belonging to the FQAM resource element.

In step 2810, the transmitting device 200 may map a QAM signal of a second symbol corresponding to the QAM mode to the frequency tone to which the QAM signal of the first symbol is mapped.

Tone location information on the frequency tone to which the QAM signal of the first symbol and the QAM signal of the second symbol are mapped among the preset number of frequency tones belonging to the FQAM resource element may correspond to the FSK signal of the first symbol, thereby being used as information for demodulation together with QAM constellation information of the first symbol in the mapped frequency tone.

Further, no signal may be mapped to at least one remaining frequency tone except the frequency tone (or activation tone) to which the QAM signal of the first symbol and the QAM signal of the second symbol are mapped, among the preset number of frequency tones belonging to the FQAM resource element. Accordingly, interference may have a characteristic similar to the non-Gaussian form in the system.

In step 2815, the transmitting device 200 may transmit the QAM signal of the first symbol through a first antenna, and transmit the QAM signal of the second symbol through a second antenna.

Further, the transmitting device 200 may further include an operation of transmitting allocation information to the receiving device. The allocation information may be transmitted together with the QAM signal of the first symbol and the QAM signal of the second symbol, or transmitted before foregoing step 2815. The allocation information is information on resources allocated to the receiving device, and may include information on location or size of at least one (FQAM) resource element. Further, the allocation information may also include information on modulation mode corresponding to at least one of the first symbol and the second symbol.

Figure 29:
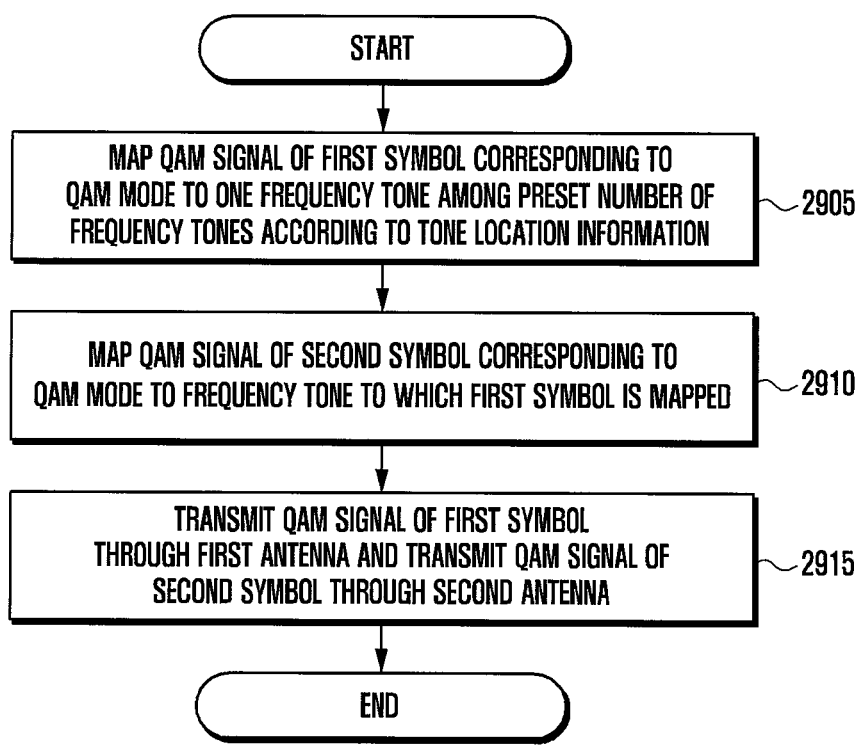
FIG. 29 is another flowchart illustrating a method for transmitting a signal on the basis of multiple antennas according to an embodiment of the present invention.

FIG. 29 is another flowchart illustrating a method for transmitting a signal on the basis of multiple antennas according to an embodiment of the present invention. For example, an operation for transmitting a signal on the basis of multiple antennas may be performed in the transmitting device 200 described above.

In step 2905, the transmitting device 200 may map a QAM signal of a first symbol corresponding to the QAM mode to one frequency tone among the preset number of frequency tones according to tone location information.

In step 2910, the transmitting device 200 may map a QAM signal of a second symbol corresponding to the QAM mode to the frequency tone to which the first symbol is mapped.

In step 2915, the transmitting device 200 may transmit the QAM signal of the first symbol through a first antenna, and transmit the QAM signal of the second symbol through a second antenna.

Figure 30:
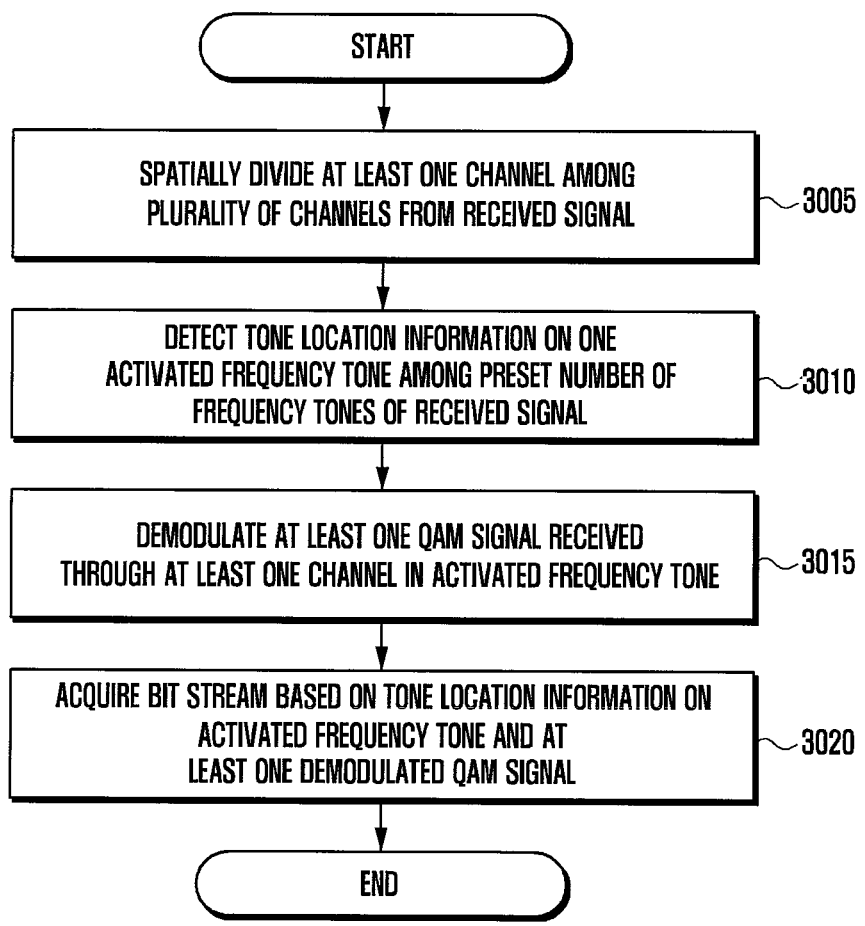
FIG. 30 is a flowchart illustrating a method for receiving a signal on the basis of multiple antennas according to an embodiment of the present invention.

FIG. 30 is a flowchart illustrating a method for receiving a signal on the basis of multiple antennas according to an embodiment of the present invention. For example, an operation for receiving a signal on the basis of multiple antennas may be performed in the receiving device 300 described above.

In step 3005, the receiving device 300 may spatially divide at least one channel among a plurality of channels from a received signal.

In step 3010, the receiving device 300 may detect tone location information on one activated frequency tone among the preset number of frequency tones of the received signal. The preset number of frequency tones may be basic resource elements belonging to the FQAM resource element. The FQAM resource element may be configured of the preset number of frequency tones. Among the preset number of frequency tones, at least one remaining tone except the activated frequency tone may be a null tone that does not carry a signal.

Further, the receiving device 300 may further include an operation of receiving allocation information from the transmitting device. In this case, step 3010 may be a step of detecting tone location information on the activated frequency tone carrying a signal among the preset number of frequency tones belonging to at least one resource element corresponding to the allocation information. Here, the at least one resource element may be configured of the preset number of frequency tones, respectively.

In step 3015, the receiving device 300 may demodulate at least one QAM signal received through at least one channel in the activated frequency tone.

In step 3020, the receiving device 300 may acquire a bit stream based on the tone location information of the frequency tone and at least one demodulated QAM signal.

Figure 31:
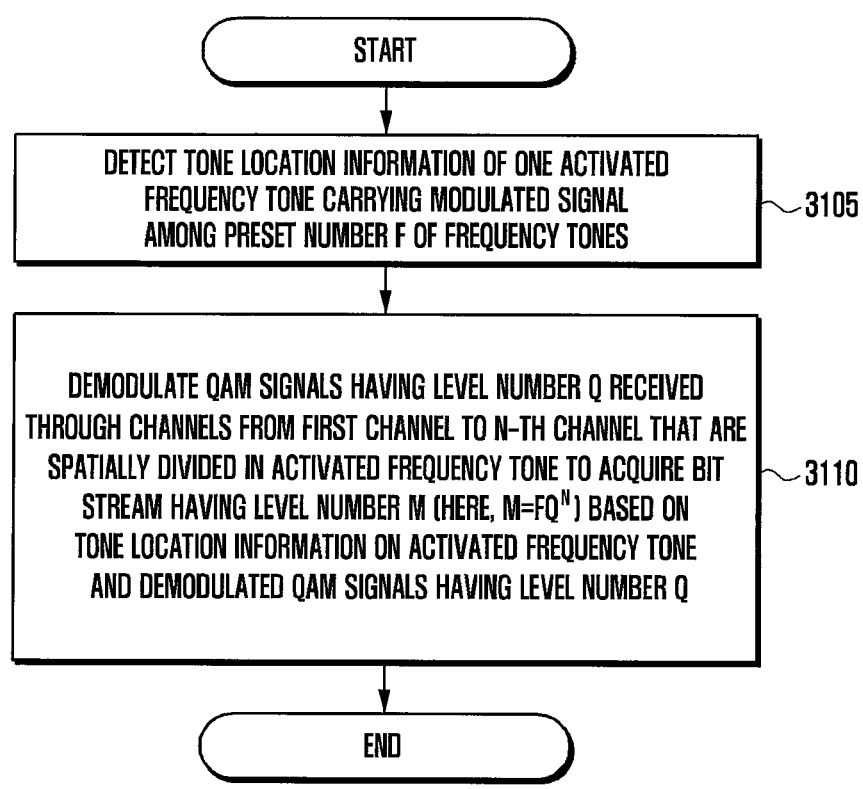
FIG. 31 is another flowchart illustrating a method for receiving a signal on the basis of multiple antennas according to an embodiment of the present invention.

FIG. 31 is another flowchart illustrating a method for receiving a signal on the basis of multiple antennas according to an embodiment of the present invention. For example, an operation for receiving a signal on the basis of multiple antennas may be performed in the receiving device 300 described above.

In step 3105, the receiving device 300 may detect tone location information of one activated frequency tone carrying a modulated signal among the preset number F of frequency tones. The preset number F of frequency tones may be basic resource elements belonging to the FQAM resource element. The FQAM resource element may be configured of the preset number F of frequency tones.

In step 3110, the receiving device 300 may demodulate QAM signals having a level number Q received through channels from a first channel to N-th channel that are spatially divided in the activated frequency tone to acquire a bit stream having a level number M (here, $M=FQ^N$) based on tone location information on the activated frequency tone and the demodulated QAM signals.

In FIGS. 29 to 31, it should be noted that at least a part of the steps described as an example of the method for transmitting and receiving a signal on the basis of multiple antennas may be modified or omitted, or an order of the illustrated steps may also be changed.

Figure 32:
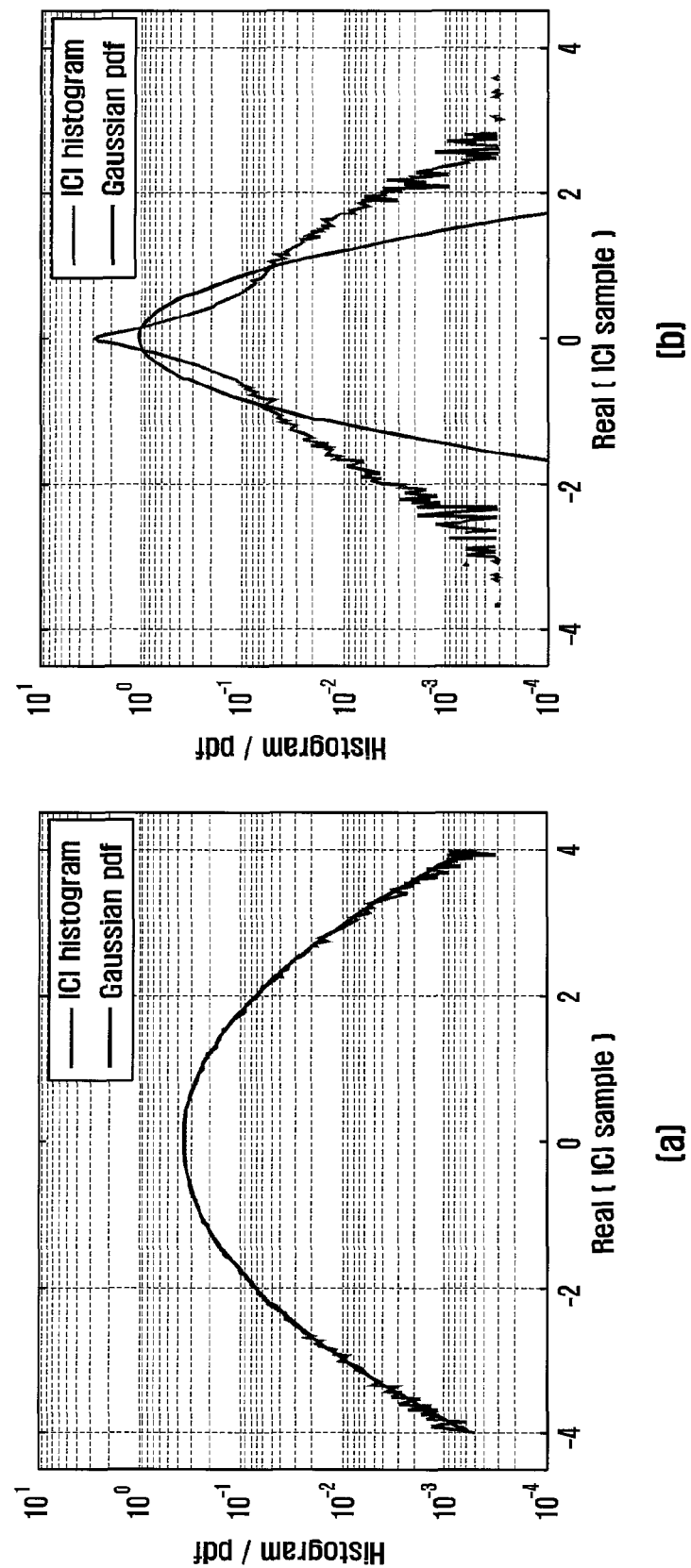
FIG. 32 is a graph illustrating a noise characteristic in a system according to an embodiment of the present invention.

FIG. 32 is a graph illustrating a noise characteristic in a system according to an embodiment of the present invention.

In the system, a value of signal to interference plus noise ratio (hereinafter, referred to as SINR) applied when performing link adaptation between a first electronic device (e.g. base station) and a second electronic device (e.g. portable terminal) may vary depending on the non-Gaussian interference amount characteristic. In order for the first electronic device to determine modulation and coding scheme (MCS) of an FQAM channel, channel quality information (hereinafter, referred to as CQI) may be received from the second electronic device. In the system according to an embodiment, the second electronic device may acquire interference signal characteristic information when receiving an FQAM signal, in order to measure the CQI.

The first electronic device or the second electronic device may acquire the interference signal characteristic information using Equations 2, 3, and 4 below.

$$\alpha = \frac{\ln(3^6/2^{10})}{\ln\left(\frac{\left(\frac{1}{N_s}\sum |Z(k)|\right)^2}{\frac{1}{N_s}\sum |Z(k)|^2} - \pi/4 + 3^2/2^{3.5}\right) + \ln(3/2\sqrt{2})} \quad \text{[Equation 2]}$$

$$Z[k] = \sum_{m=1, m\neq M}^{N_{BS}} \sqrt{I_m}\,(H_m[k]c_{m,k}p_{m,k}) + W[k] \quad \text{[Equation 3]}$$

Here, α may represent a value of interference characteristic information, and $N_s$ may represent the number of resource elements (e.g. basic resource elements) belonging to a resource area configuring one codeword. For example, $N_s$ may be the number of resource elements (RE) in a physical downlink shared channel (PDSCH) scheduled in a long term evolution (LTE) system. Z[k] may be a sum of interference signals received from $N_{BS}$ adjacent base stations in resource element index k. M may be an index for an adjacent base station, and M may be an index for a serving base station. $I_m$ may be an attenuation amount of channel power determined by path attenuation and shadow fading from an m-th base station. $H_m[k]$ may be a channel value corresponding to an index of a k-th resource element between the m-th base station and a terminal. $C_{m,k}$ may be a symbol mapped to the k-th resource element in the m-th base station. $P_{m,k}$ may be a transmission power to be allocated to the symbol mapped to the k-th resource element in the m-th base station. W[k] may represent a noise signal received through the k-th resource element.

Application range of the MCS level in the link may vary depending on the value of the interference characteristic information. For example, when a value of α is 2, the interference may have a characteristic similar to a Gaussian interference channel. Further, when a value of α is a small value such as 1 or 0.5, the interference may have a characteristic similar to a non-Gaussian interference channel. As the non-Gaussian interference characteristic of the interference signal is increased, a value having higher spectral efficiency may be designated as the MCS level at the time of performing the link adaptation.

(a) of FIG. 32 illustrates a statistical characteristic of an interference signal received in a second electronic device (e.g. portable terminal) positioned in an arbitrary cell when using the QAM modulation mode in first electronic devices (e.g. base stations) in the system. When acquiring a probability density function of the interference signal received in the second electronic device to compare the PDF of the interference signal with an ideal Gaussian PDF, it may be confirmed that the interference signal represents the Gaussian characteristic.

(b) of FIG. 32 illustrates a statistical characteristic of an interference signal received in a second electronic device positioned in an arbitrary cell when using the 8-FSK and the 4-QAM as the FQAM modulation mode in the first electronic devices in the system. When acquiring a PDF of the interference signal received in the second electronic device to compare the PDF of the interference signal with an ideal Gaussian PDF, the comparison result shows that there is a significant difference, thus it may be confirmed that the interference signal represents the non-Gaussian characteristic.

Figure 33:
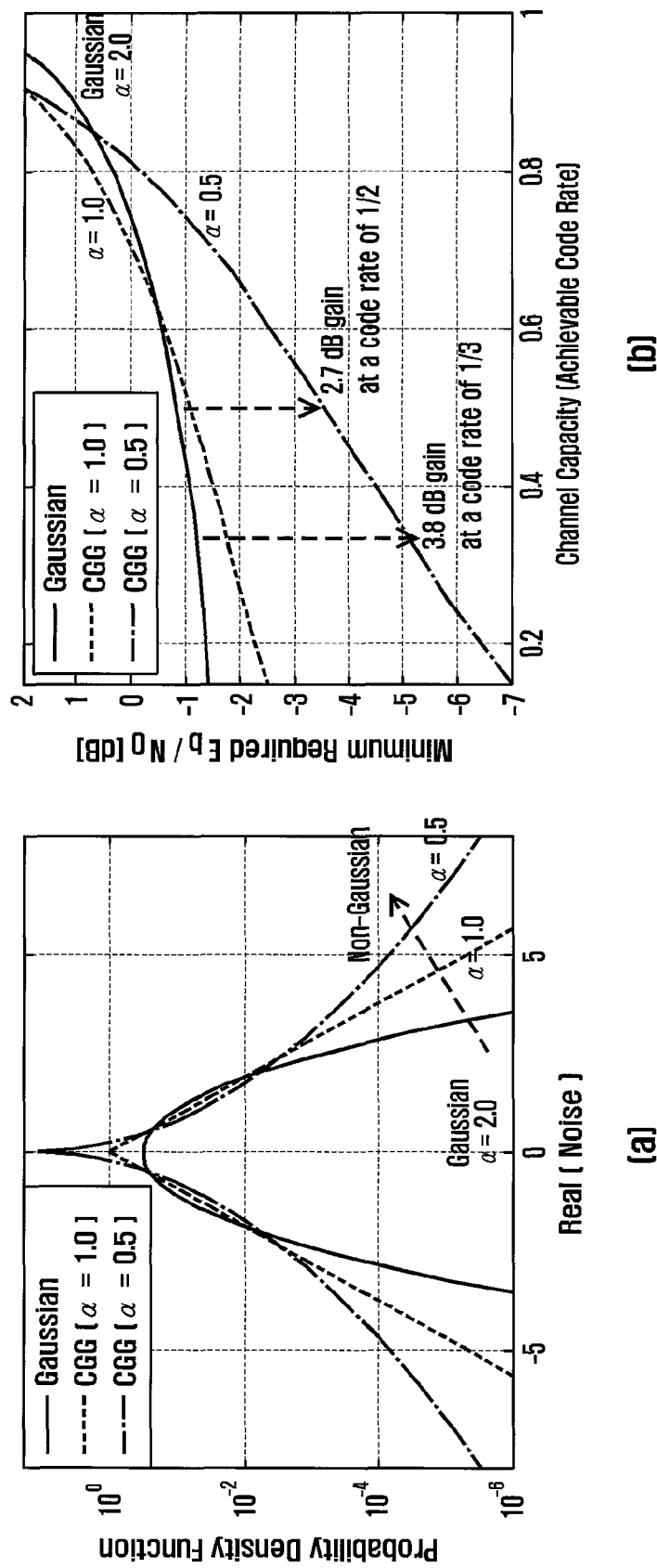
FIG. 33 is a graph illustrating a correlation between a noise characteristic and channel capacity in a system according to an embodiment of the present invention.

FIG. 33 is a graph illustrating a correlation between a noise characteristic and channel capacity in a system according to an embodiment of the present invention.

The non-Gaussian characteristic of the FQAM interference signal may be a phenomenon occurring due to utilization of the FSK included in the modulation modes. For example, in order to sufficiently obtain the non-Gaussian characteristic of the interference signal, only some of basic resource elements belonging to the FQAM resource element may be used in transmitting the FQAM-modulated symbol, and the rest thereof may be in an empty state.

(a) of FIG. 33 illustrates comparison between an ideal Gaussian PDF and PDFs of an interference signal acquired by modeling the interference signal using complex generalized Gaussian (CGG) according to a Gaussian characteristic information value α.

(b) of FIG. 33 illustrates a result obtained by modeling the interference signal using the CGG and evaluating capacity of an FQAM transmission system. When comparing with a case in which the interference signal has the Gaussian characteristic, it may be confirmed that as the non-Gaussian characteristic of the interference signal modeled using the CGG, is increased (as the Gaussian characteristic information value a is decreased), a value of the signal to noise ratio (SNR) required to obtain the same capacity is decreased. For example, in the same SNR condition, the system producing interference having the non-Gaussian characteristic by using the FQAM may have higher capacity than that of the system producing interference having the Gaussian characteristic by using the QAM.

Further, it may be understood by those skilled in the art that a program for an embodiment in relation to the operation for transmitting and receiving a signal on the basis of multiple antennas described in FIGS. 28 to 31 may be configured of hardware or software or a combination of hardware and software. Further, the program for an embodiment, or an operation or a control program in the device according to an embodiment may be recorded in a recording medium, and may also be downloaded to an electronic device from a server or a computer through a communications network.

However, the present invention is not limited to the foregoing embodiments. According to still another embodiment of the present invention, the transmitting device 200 may map a QAM signal of a first symbol corresponding to the FQAM mode to one frequency tone among the preset number of frequency tones according to an FSK signal of the first symbol. The frequency tone to which the QAM signal of the first symbol is mapped, is $f_1$.

Here, the preset number may correspond to a level number representing tone location information. Further, the preset number may correspond to a level number of the FSK signal of the first symbol corresponding to the FQAM mode. The preset number of frequency tones may be basic resource elements belonging to the FQAM resource element.

After mapping the QAM signal of the first symbol, the transmitting device may map a QAM signal of a second symbol corresponding to the QAM mode to the frequency tone $f_1$ to which the QAM signal of the first symbol is mapped and a frequency tone different from the frequency tone $f_1$ as well. The frequency tone different from the frequency tone $f_1$ is $f_2$.

Further, transmission power required to transmit the signal when the QAM signal of the second symbol is mapped to $f_1$ is $P_{f_1}$, and transmission power required to transmit the signal when the QAM signal of the second symbol is mapped to $f_2$ is $P_{f_2}$. When the QAM signal of the second symbol is mapped to $f_1$, a resource may not be mapped to the frequency $f_2$, and when the resource is not mapped to the frequency $f_2$, the transmission power $P_{f_2}$ is 0. Accordingly, interference may have a characteristic similar to the non-Gaussian form in the system. Meanwhile, when the QAM signal of the second symbol is mapped to $f_2$, in a case in which $P_{f_1}$ is smaller than $P_{f_2}$, interference may have a characteristic similar to the non-Gaussian form in the system.

When performing the mapping process, the transmitting device 200 may transmit the QAM signal of the first symbol through a first antenna, and transmit the QAM signal of the second symbol through a second antenna.

What is claimed is:

1. A method for transmitting a signal on a basis of multiple antennas, the method comprising:

mapping a quadrature amplitude modulation (QAM) signal of a first symbol corresponding to a hybrid frequency shift keying and quadrature amplitude modulation (FQAM) mode to one frequency tone among a preset number of frequency tones according to a frequency shift keying (FSK) signal of the first symbol;

mapping a QAM signal of a second symbol corresponding to a QAM mode to the frequency tone to which the QAM signal of the first symbol is mapped; and transmitting the QAM signal of the first symbol through a first antenna and transmitting the QAM signal of the second symbol through a second antenna.

2. The method of claim 1, wherein among the preset number of frequency tones, no signal is mapped to at least one remaining frequency tone except for the frequency tone to which the QAM signal of the first symbol and the QAM signal of the second symbol are mapped, and the first symbol corresponding to the FQAM mode is encoded using a non-binary channel code, and the second symbol corresponding to the QAM mode is encoded using a binary channel code.

3. The method of claim 1, wherein the mapping of the QAM signal of the second symbol further includes mapping the QAM signal of the second symbol to the frequency tone to which the QAM signal of the first symbol is mapped and a frequency tone different from the frequency tone to which the QAM signal of the first symbol is mapped, and transmission power required to transmit the QAM signal of the second symbol in the frequency tone different from the frequency tone to which the QAM signal of the first symbol is mapped is greater than transmission power required to transmit the QAM signal of the second symbol in the frequency tone to which the QAM signal of the first symbol is mapped.

4. The method of claim 1, wherein tone location information on the frequency tone to which the QAM signal of the first symbol and the QAM signal of the second symbol are mapped among the preset number of frequency tones corresponds to the FSK signal of the first symbol to be used as information for demodulation together with QAM constellation information of the first symbol in the mapped frequency tone, and the preset number corresponds to a level number representing one of the FSK signal of the first symbol and the tone location information.

5. The method of claim 1, wherein when N different symbols including the first symbol corresponding to the FQAM mode and N−1 symbols corresponding to the QAM mode that include the second symbol are transmitted together through N antennas including the first antenna and the second antenna, a level number indicating information during time duration during which the N symbols are transmitted once using the preset number of frequency tones is represented by Equation below, and the N antennas including the first antenna and the second antenna mean physically divided N antennas or N antenna ports logically defined by different precoding vectors:

[Equation]

$$M=FQ^N$$

wherein M represents the level number, F represents a level number of the FSK signal of the first symbol corresponding to tone location information of a frequency tone to which a signal is mapped among the preset number of frequency tones, and Q represents a QAM level number that QAM signals of the N symbols identically have in the mapped frequency tone;

wherein N represents a number corresponding to an amount of the antennas or an amount of the symbols.

6. The method of claim 1, further comprising: when the first symbol and the second symbol are space-time coded, transmitting a QAM signal of the space-time coded second symbol through the first antenna and transmitting a QAM signal of the space-time coded first symbol through the second antenna by using the mapped frequency tone after the QAM signal of the first symbol and the QAM signal of the second symbol are transmitted through the mapped frequency tone that is the frequency tone corresponding to the FSK signal of the first symbol among the preset number of frequency tones.

7. The method of claim 1, wherein the transmitting of the QAM signal of the first symbol and the QAM signal of the second symbol includes multiplexing signals mapped to a plurality of tones including the preset number of frequency tones by at least one of a frequency division multiplexing (FDM) scheme, an orthogonal frequency division multiplexing (OFDM) scheme, and a single carrier-FDM (SC-FDM) scheme.

8. The method of claim 1, wherein in time duration during which the QAM signal of the first symbol and the QAM signal of the second symbol are transmitted, one frequency tone among the preset number of frequency tones is used, and at least one remaining frequency tone is not used in at least one adjacent base station located at periphery, respectively.

9. A transmitting device for transmitting a signal based on multiple antennas, the transmitting device comprising:

a radio frequency (RF) processing circuitry configured to:
transmit a quadrature amplitude modulation (QAM) signal of a first symbol corresponding to a hybrid frequency shift keying and quadrature amplitude modulation (FQAM) mode through a first antenna, and transmit a QAM signal of a second symbol corresponding to a QAM mode through a second antenna, and a modulation processing circuitry configured to map the QAM signal of the first symbol to one frequency tone among a preset number of frequency tones according to an FSK signal of the first symbol and map the QAM signal of the second symbol to the frequency tone to which the QAM signal of the first symbol is mapped.

10. The transmitting device of claim 9, wherein the modulation processing circuitry includes an FSK symbol mapper configured to designate one frequency tone corresponding to the FSK signal of the first symbol among the preset number of frequency tones and map the QAM signal of the first symbol and the QAM signal of the second symbol to the designated frequency tone.

11. The transmitting device of claim 9, wherein the modulation processing circuitry is configured to map the QAM signal of the second symbol to the frequency tone to which the QAM signal of the first symbol is mapped and a frequency tone different from the frequency tone to which the QAM signal of the first symbol is mapped, transmission power required to transmit the QAM signal of the second symbol in the frequency tone different from the frequency tone to which the QAM signal of the first symbol is mapped is greater than transmission power required to transmit the QAM signal of the second symbol in the frequency tone to which the QAM signal of the first symbol is mapped, and N antennas including the first antenna and the second antenna mean physically divided N antennas or N antenna ports logically defined by different precoding vectors, wherein N represents a number corresponding to an amount of the antennas or an amount of the symbols.

12. A method for receiving a signal from a transmitting device, the method comprising:
  receiving a signal including a quadrature amplitude modulation (QAM) signal of a first symbol and a QAM signal of a second symbol, wherein the QAM signal of the second symbol corresponds to a QAM mode and to a frequency tone to which the QAM signal of the first symbol is mapped, and wherein the QAM signal of the first symbol corresponds to a hybrid frequency shift keying and quadrature amplitude modulation (FQAM) mode and to one frequency tone among a preset number of frequency tones according to a frequency shift keying (FSK) signal of the first symbol, wherein the QAM signal of the first symbol is transmitted through a first antenna of the transmitting device and the QAM signal of the second symbol is transmitted through a second antenna of the transmitting device;
  spatially dividing at least one channel among a plurality of channels from the received signal;
  detecting tone location information on one activated frequency tone among the preset number of frequency tones of the received signal; and
  demodulating at least one QAM signal received through at least one channel in the activated frequency tone.

13. The method of claim 12, further comprising:
  acquiring a bit stream based on the tone location information on the activated frequency tone and at least one demodulated QAM signal; and
  receiving allocation information from a transmitting device,
  wherein in the detecting of the tone location information on the activated frequency tone, the tone location information on the activated frequency tone carrying a signal among the preset number of frequency tones belonging to at least one resource element corresponding to the allocation information is detected, and at least one resource element is each configured of the preset number of frequency tones.

14. A receiving device for receiving a signal from a transmitting device, the receiving device comprising:
  a multi-antenna reception signal processing circuitry configured to:
    receive a signal including a quadrature amplitude modulation (QAM) signal of a first symbol and a QAM signal of a second symbol, wherein the QAM signal of the second symbol corresponds to a QAM mode and to a frequency tone to which the QAM signal of the first symbol is mapped, and wherein the QAM signal of the first symbol corresponds to a hybrid frequency shift keying and quadrature amplitude modulation (FQAM) mode and to one frequency tone among a preset number of frequency tones according to a frequency shift keying (FSK) signal of the first symbol, wherein the QAM signal of the first symbol is transmitted through a first antenna of the transmitting device and the QAM signal of the second symbol is transmitted through a second antenna of the transmitting device;
    spatially divide at least one channel among a plurality of channels from the received signal;
  an activation tone detection processing circuitry configured to detect tone location information on one activated frequency tone among the preset number of frequency tones of the received signal; and
  a demodulation processing circuitry configured to demodulate at least one QAM signal received through at least one channel in the activated frequency tone.

15. The receiving device of claim 14, wherein the demodulation processing circuitry is configured to acquire a bit stream based on the tone location information on the activated frequency tone and at least one demodulated QAM signal.

16. The transmitting device of claim 9, wherein among the preset number of frequency tones, no signal is mapped to at least one remaining frequency tone except for the frequency tone to which the QAM signal of the first symbol and the QAM signal of the second symbol are mapped, and the first symbol corresponding to the FQAM mode is encoded using a non-binary channel code, and the second symbol corresponding to the QAM mode is encoded using a binary channel code.

17. The transmitting device of claim 9, wherein to map the QAM signal of the second symbol, the modulation processing circuitry is further configured to map the QAM signal of the second symbol to the frequency tone to which the QAM signal of the first symbol is mapped and a frequency tone different from the frequency tone to which the QAM signal of the first symbol is mapped, and transmission power required to transmit the QAM signal of the second symbol in the frequency tone different from the frequency tone to which the QAM signal of the first symbol is mapped is greater than transmission power required to transmit the QAM signal of the second symbol in the frequency tone to which the QAM signal of the first symbol is mapped.

18. The transmitting device of claim 9, wherein tone location information on the frequency tone to which the QAM signal of the first symbol and the QAM signal of the second symbol are mapped among the preset number of frequency tones corresponds to the FSK signal of the first symbol to be used as information for demodulation together with QAM constellation information of the first symbol in the mapped frequency tone, and the preset number corresponds to a level number representing one of the FSK signal of the first symbol and the tone location information.

19. The transmitting device of claim 9, wherein the RF processing circuitry is further configured, when the first symbol and the second symbol are space-time coded, to transmit a QAM signal of the space-time coded second symbol through the first antenna and transmit a QAM signal of the space-time coded first symbol through the second antenna by using the mapped frequency tone after the QAM signal of the first symbol and the QAM signal of the second symbol are transmitted through the mapped frequency tone that is the frequency tone corresponding to the FSK signal of the first symbol among the preset number of frequency tones.

20. The transmitting device of claim 9, wherein the radio frequency (RF) processing circuitry is configured to transmit the QAM signal of the first symbol and the QAM signal of the second symbol by multiplexing signals mapped to a plurality of tones including the preset number of frequency tones by at least one of a frequency division multiplexing (FDM) scheme, an orthogonal frequency division multiplexing (OFDM) scheme, and a single carrier-FDM (SC-FDM) scheme.

* * * * *